(12) United States Patent
Chen

(10) Patent No.: US 9,239,447 B1
(45) Date of Patent: Jan. 19, 2016

(54) OPTICAL IMAGING LENS ASSEMBLY, IMAGE CAPTURING UNIT AND ELECTRONIC DEVICE

(71) Applicant: LARGAN Precision Co., Ltd., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/472,101

(22) Filed: Aug. 28, 2014

(30) Foreign Application Priority Data

Jul. 4, 2014 (TW) .............................. 103123212 A

(51) Int. Cl.
*G02B 9/62* (2006.01)
*G02B 13/00* (2006.01)
*G02B 13/18* (2006.01)

(52) U.S. Cl.
CPC .............. *G02B 13/0045* (2013.01); *G02B 9/62* (2013.01); *G02B 13/18* (2013.01)

(58) Field of Classification Search
CPC .... G02B 13/0045; G02B 13/00; G02B 13/24; G02B 13/002; G02B 13/0015; G02B 9/64; G02B 9/62
USPC .......................... 359/713, 754–757, 759, 760
See application file for complete search history.

(56) References Cited

U.S. PATENT DOCUMENTS

| | | | | |
|---|---|---|---|---|
| 8,854,745 B1* | 10/2014 | Chen | .................. | G02B 13/0045 359/713 |
| 2013/0314804 A1* | 11/2013 | Kubota | .............. | G02B 13/0015 359/757 |
| 2014/0063616 A1* | 3/2014 | Okano | ................ | G02B 13/0045 359/713 |
| 2014/0063618 A1* | 3/2014 | Park | ................... | G02B 13/0045 359/713 |
| 2014/0118817 A1* | 5/2014 | Jung | ................... | G02B 13/0045 359/713 |
| 2014/0118844 A1* | 5/2014 | Tsai | .................... | G02B 13/0045 359/713 |
| 2015/0049393 A1* | 2/2015 | Park | ................... | G02B 13/0045 359/713 |
| 2015/0109684 A1* | 4/2015 | Son | .................... | G02B 13/0045 359/713 |
| 2015/0109692 A1* | 4/2015 | Son | ....................... | G02B 13/006 359/757 |
| 2015/0138431 A1* | 5/2015 | Shin | ......................... | G02B 9/62 348/360 |
| 2015/0168677 A1* | 6/2015 | Lee | ...................... | H04N 5/2258 348/222.1 |
| 2015/0192760 A1* | 7/2015 | Huang | ............... | G02B 13/0045 359/713 |

FOREIGN PATENT DOCUMENTS

| | | |
|---|---|---|
| JP | 2014-010399 | 1/2014 |
| JP | 2014-010400 | 1/2014 |
| JP | 2014-010401 | 1/2014 |
| TW | 201418763 A | 5/2014 |

OTHER PUBLICATIONS

Intellectual Property Office, Ministry of Economic Affairs, R.O.C., "Office Action", Taiwan, Feb. 9, 2015.

* cited by examiner

*Primary Examiner* — Zachary Wilkes
*Assistant Examiner* — William R Alexander
(74) *Attorney, Agent, or Firm* — Locke Lord LLP; Tim Tingkang Xia, Esq.

(57) ABSTRACT

An optical imaging lens assembly includes, in order from an object side to an image side, a first lens element, a second lens element, a third lens element, a fourth lens element, a fifth lens element, and a sixth lens element. The first lens element with positive refractive power in a paraxial region thereof has an object-side surface being convex in a paraxial region thereof. The second lens element has refractive power in a paraxial region. The third lens element has negative refractive power in a paraxial region thereof. The fourth lens element has negative refractive power in a paraxial region thereof. The fifth lens element has refractive power in a paraxial region thereof. The sixth lens element with positive refractive power in a paraxial region thereof has an object-side surface being convex in a paraxial region thereof and an image-side surface being concave in a paraxial region thereof.

25 Claims, 17 Drawing Sheets

OPTICAL IMAGING LENS ASSEMBLY, IMAGE CAPTURING UNIT AND ELECTRONIC DEVICE

RELATED APPLICATIONS

This application claims priority to Taiwan Application Serial Number 103123212, filed Jul. 4, 2014, which is incorporated by reference herein in its entirety.

BACKGROUND

1. Technical Field

The present disclosure relates to an optical imaging lens assembly, an image capturing unit and an electronic device, more particularly to an optical imaging lens assembly and an image capturing unit applicable to an electronic device.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in an electronic product mainly adopts a five-element lens structure. Due to the popularity of electronic devices with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure are developed to enhance resolution and image quality. However, the optical systems with six-element lens structure have severe aberration and high sensitivity. Furthermore, the image of the optical system will be excessively curved and tends to be defocused in the peripheral region of the image; therefore, the imaging ability and image quality of the optical system is limited.

SUMMARY

According to one aspect of the present disclosure, an optical imaging lens assembly includes, in order from an object side to an image side, a first lens element, a second lens element, a third lens element, a fourth lens element, a fifth lens element, and a sixth lens element. The first lens element with positive refractive power in a paraxial region thereof has an object-side surface being convex in a paraxial region thereof. The second lens element has refractive power in a paraxial region thereof. The third lens element has negative refractive power in a paraxial region thereof. The fourth lens element has negative refractive power in a paraxial region thereof. The fifth lens element has refractive power in a paraxial region thereof, wherein both of an object-side surface and an image-side surface of the fifth lens element are aspheric. The sixth lens element with positive refractive power in a paraxial region thereof has an object-side surface being convex in a paraxial region thereof and an image-side surface being concave in a paraxial region thereof, wherein the image-side surface of the sixth lens element has at least one convex shape in an off-axis region thereof, and both of the object-side surface and the image-side surface of the sixth lens element are aspheric. The optical imaging lens assembly has a total of six lens elements with refractive power. When a focal length of the optical imaging lens assembly in the paraxial region thereof is f, a focal length of the third lens element in the paraxial region thereof is f3, a focal length of the fourth lens element in the paraxial region thereof is f4, a focal length of the sixth lens element in the paraxial region thereof is f6, a vertical distance between a non-axial critical point on the image-side surface of the sixth lens element and an optical axis is Yc62, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$$0 < f3 * f4/f6;$$

$$0.20 < Yc62/f < 0.75; \text{ and}$$

$$0.90 < T23/(T12+T34+T45+T56).$$

According to another aspect of the present disclosure, an optical imaging lens assembly includes, in order from an object side to an image side, a first lens element, a second lens element, a third lens element, a fourth lens element, a fifth lens element, and a sixth lens element. The first lens element with positive refractive power in a paraxial region thereof has an object-side surface being convex in a paraxial region thereof. The second lens element has refractive power in a paraxial region thereof. The third lens element has negative refractive power in a paraxial region thereof. The fourth lens element has negative refractive power in a paraxial region thereof. The fifth lens element with refractive power in a paraxial region thereof has an object-side surface being convex in a paraxial region thereof, wherein both of the object-side surface and an image-side surface of the fifth lens element are aspheric. The sixth lens element with positive refractive power in a paraxial region thereof has an object-side surface being convex in a paraxial region thereof and an image-side surface being concave in a paraxial region thereof, wherein the image-side surface of the sixth lens element has at least one convex shape in an off-axis region thereof, and both of the object-side surface and the image-side surface of the sixth lens element are aspheric. The optical imaging lens assembly has a total of six lens elements with refractive power. When a focal length of the optical imaging lens assembly in the paraxial region thereof is f, a focal length of the third lens element in the paraxial region thereof is f3, a focal length of the fourth lens element in the paraxial region thereof is f4, a focal length of the sixth lens element in the paraxial region thereof is f6, a vertical distance between a non-axial critical point on the image-side surface of the sixth lens element and an optical axis is Yc62, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$0 < f3*f4/f6;$ $0.20 < Yc62/f < 0.75;$ and $0.75 < T23/(T12+T34+T45+T56).$

According to still yet another aspect of the present disclosure, an optical imaging lens assembly includes, in order from an object side to an image side, a first lens element, a second lens element, a third lens element, a fourth lens element, a fifth lens element, and a sixth lens element. The first lens element with positive refractive power in a paraxial region thereof has an object-side surface being convex in a paraxial region thereof. The second lens element has refractive power in a paraxial region thereof. The third lens element has negative refractive power in a paraxial region thereof. The fourth lens element has negative refractive power in a paraxial region thereof. The fifth lens element has positive refractive power in a paraxial region thereof, wherein both of an object-side surface and an image-side surface of the fifth lens element are aspheric. The sixth lens element with positive refractive power in a paraxial region thereof having an object-side surface being convex in a paraxial region thereof and an image-side surface being concave in a paraxial region thereof, wherein the image-side surface of the sixth lens element has at least one convex shape in an off-axis region thereof, and both of the object-side surface and the image-side surface of the sixth lens element are aspheric. The optical imaging lens assembly has a total of six lens elements with refractive power. When a focal length of the optical imaging lens assembly in the paraxial region thereof is f, a focal length of the third lens element in the paraxial region thereof is f3, a focal length of the fourth lens element in the paraxial region thereof is f4, a focal length of the sixth lens element in the paraxial region thereof is f6, a vertical distance between a non-axial critical point on the image-side surface of the sixth lens element and an optical axis is Yc62, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$0 < f3*f4/f6;$ $0.20 < Yc62/f < 0.75;$ and $0.55 < T23/(T12+T34+T45+T56).$

According to still another aspect of the present disclosure, an image capturing unit includes the optical imaging lens assembly according to the aforementioned aspect and an image sensor, wherein the image sensor is disposed on the image side of the optical imaging lens assembly.

According to yet another aspect of the present disclosure, an electronic device includes the image capturing unit according to the aforementioned aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
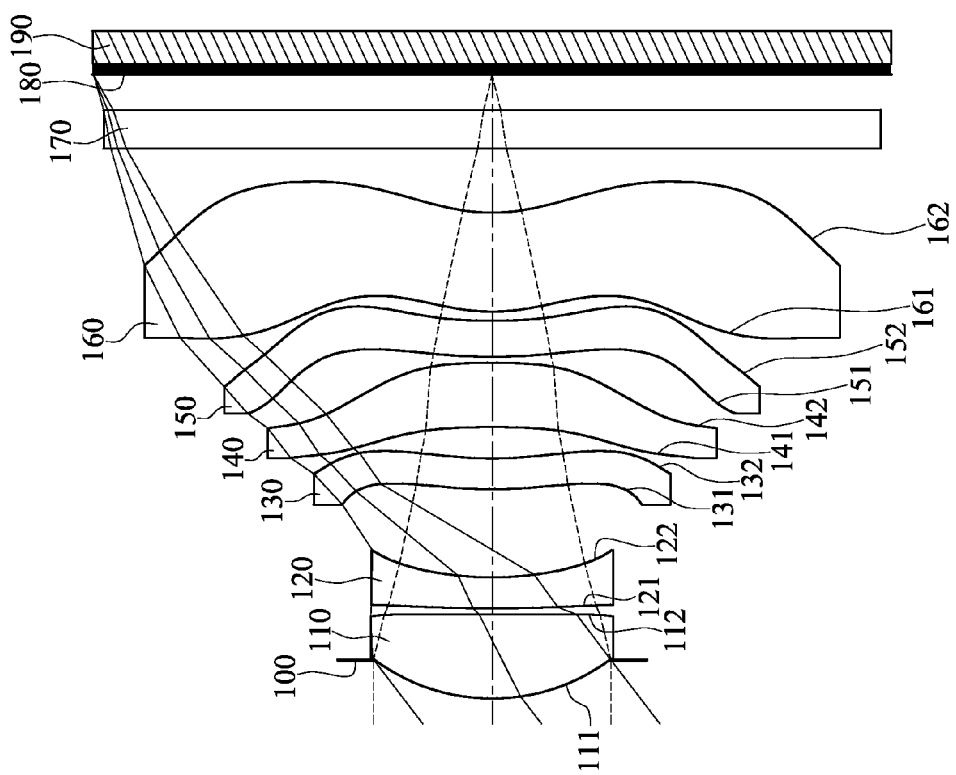
FIG. 1 is a schematic view of an image capturing unit according to the 1st embodiment of the present disclosure.

An optical imaging lens assembly includes, in order from an object side to an image side, a first lens element, a second lens element, a third lens element, a fourth lens element, a fifth lens element, and a sixth lens element. The optical imaging lens assembly has a total of six lens elements with refractive power.

The first lens element with positive refractive power in a paraxial region thereof has an object-side surface being convex in a paraxial region thereof. Therefore, it is favorable for balancing the arrangement of the positive refractive power so as to avoid overloading the positive refractive power on one single lens element resulting in excessive spherical aberrations. It is also favorable for reducing the sensitivity of the optical imaging lens assembly.

The second lens element can have negative refractive power in a paraxial region thereof. Therefore, it is favorable for correcting the aberration from the first lens element. In some other embodiments, the second lens element can have positive refractive power in a paraxial region thereof. Therefore, it is favorable for reducing the spherical aberration and the sensitivity of the optical imaging lens assembly.

The third lens element has negative refractive power in a paraxial region thereof. Therefore, it is favorable for further correcting the aberration of the optical imaging lens assembly.

The fourth lens element with negative refractive power in a paraxial region thereof can have an object-side surface being concave in a paraxial region thereof and an image-side surface being convex in a paraxial region thereof. Therefore, it is favorable for effectively correcting the astigmatism and the Petzval's sum of the optical imaging lens assembly so as to improve the flatness of the image surface.

The fifth lens element can have positive refractive power in a paraxial region thereof. The fifth lens element can have an object-side surface being convex in a paraxial region thereof and an image-side surface being concave in a paraxial region thereof. Both of the object-side surface and the image-side surface of the fifth lens element can have at least one inflection point. Both of the object-side surface and the image-side surface of the fifth lens element are aspheric. Therefore, it is favorable for reducing high-order spherical aberration and the astigmatism. Furthermore, it is also favorable for correcting the aberration of the off-axis.

The sixth lens element with positive refractive power in a paraxial region thereof has an object-side surface being convex in a paraxial region thereof and an image-side surface being concave in a paraxial region thereof. The image-side surface of the sixth lens element has at least one convex shape in an off-axis region thereof. Both of the object-side surface and the image-side surface of the sixth lens element are aspheric. Therefore, it is favorable for the principal point of the optical imaging lens assembly being positioned away from the image side of the optical imaging lens assembly and reducing a total track length of the optical imaging lens assembly so as to keep a compact size thereof. Furthermore, it is favorable for effectively reducing the incident angle of the light projecting onto the image sensor, so that it is favorable for improving the image-sensing efficiency of the image sensor and further correcting the aberration of the off-axis.

When a focal length of the third lens element in the paraxial region thereof is f3, a focal length of the fourth lens element in the paraxial region thereof is f4, a focal length of the sixth lens element in the paraxial region thereof is f6, the following condition is satisfied: $0<f3*f4/f6$. Therefore, it is favorable for correcting image distortion so that the image is more planar from a paraxial region thereof to an off-axis region thereof.

Figure 15:
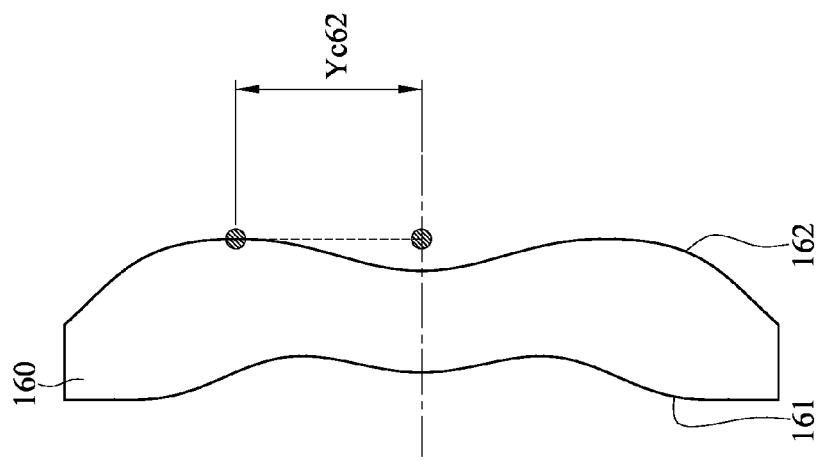
FIG. 15 is a schematic view of Yc62 of a sixth lens element in FIG. 1.

When a focal length of the optical imaging lens assembly in the paraxial region thereof is f, a vertical distance between a non-axial critical point on the image-side surface of the sixth lens element and an optical axis is Yc62, the following condition is satisfied: $0.20<Yc62/f<0.75$. Therefore, it is favorable for the principal point of the optical imaging lens assembly being positioned away from the image side of the optical imaging lens assembly and reducing the total track length of the optical imaging lens assembly so as to keep the compact size thereof. Furthermore, it is favorable for effectively reducing the incident angle of the light projecting onto the image sensor, so that it is favorable for improving the image-sensing efficiency of the image sensor and further correcting the aberration of the off-axis. As seen in FIG. 15, FIG. 15 is a schematic view of Yc62 of a sixth lens element in FIG. 1, the critical point on the image-side surface of the sixth lens element is a non-axial point on the image-side surface of the sixth lens element where its tangent is perpendicular to the optical axis. Specifically, the critical points mentioned above are not located on the optical axis.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, the following condition is satisfied: $0.55<T23/(T12+T34+T45+T56)$. Therefore, it is favorable for reducing the total track length of the optical imaging lens assembly so as to keep the optical imaging lens assembly compact. Preferably, the following condition is satisfied: $0.75<T23/(T12+T34+T45+T56)$. More preferably, the following condition is satisfied: $0.90<T23/(T12+T34+T45+T56)$. Much more preferably, the following condition is satisfied: $1.0<T23/(T12+T34+T45+T56)<2.5$.

When an Abbe number of the second lens element is V2, an Abbe number of the third lens element is V3, an Abbe number of the fourth lens element is V4, the following condition is satisfied: $50<V2+V3+V4<120$. Therefore, it is favorable for correcting the chromatic aberration of the optical imaging lens assembly.

When an axial distance between the object-side surface of the first lens element and the image-side surface of the sixth lens element is Td, the following condition is satisfied: $2.5 [mm]<Td<6.0 [mm]$. Therefore, it is favorable for adjusting the total track length of the optical imaging lens assembly so as to be equipped in a compact electronic device.

When a curvature radius of the object-side surface of the fifth lens element is R9, a curvature radius of the image-side surface of the fifth lens element is R10, the following condition is satisfied: $|R9/R10|<1.0$. Therefore, it is favorable for preventing the image-side of the fifth lens element from being excessively curved, so that it is favorable for molding the fifth lens element.

When a sum of axial distances between any two lens elements adjacent to each other is ΣAT (That is, $ΣAT=T12+T23+T34+T45+T56$), a sum of central thicknesses of the first lens element through the sixth lens element is ΣCT (That is, $ΣCT=CT1+CT2+CT3+CT4+CT5+CT6$, wherein CT1 is a central thickness of the first lens element, CT2 is a central thickness of the second lens element, CT3 is a central thickness of the third lens element, CT4 is a central thickness of the fourth lens element, CT5 is a central thickness of the fifth lens element, and CT6 is a central thickness of the sixth lens element), the following condition is satisfied: $0.15<ΣAT/ΣCT<0.45$. Therefore, it is favorable for properly adjusting the axial distances and the thicknesses of the lens elements so as to effectively assemble and arrange the optical imaging lens assembly.

When the focal length of the optical imaging lens assembly in the paraxial region thereof is f, the focal length of the third lens element in the paraxial region thereof is f3, the focal length of the fourth lens element in the paraxial region thereof is f4, a focal length of the fifth lens element in the paraxial region thereof is f5, the focal length of the sixth lens element in the paraxial region thereof is f6, the following condition is satisfied: $|f/f3|+|f/f4|+|f/f5|+|f/f6|<1.0$. Therefore, it is favorable for balancing the refractive powers of the third lens element, the fourth lens element, the fifth lens element and the sixth lens element so as to correct the aberration and reduce the sensitivity of the optical imaging lens assembly.

When the axial distance between the fourth lens element and the fifth lens element is T45, the axial distance between the fifth lens element and the sixth lens element is T56, an axial distance between the object-side surface of the fourth lens element and the image-side surface of the sixth lens element is Dr7r12, the following condition is satisfied: (T45+T56)/Dr7r12<0.10. Therefore, the axial distance between the fourth lens element and the sixth lens element is more proper, so that it is favorable for reducing the total track length of the optical imaging lens assembly.

When the focal length of the optical imaging lens assembly in the paraxial region thereof is f, a curvature radius of an image-side surface of the second lens element is R4, the following condition is satisfied: f/|R4|<2.0. Therefore, it is favorable for correcting the aberration of the optical imaging lens assembly. According to the optical imaging lens assembly of the present disclosure, an air gap in a paraxial region is arranged between any two of the first lens element, the second lens element, the third lens element, the fourth lens element, the fifth lens element, and the sixth lens element that are adjacent to each other, that is, each of the first through sixth lens elements of the optical imaging lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the optical imaging lens assembly. Therefore, there is an air gap in a paraxial region between any two of the first lens element, the second lens element, the third lens element, the fourth lens element, the fifth lens element, and the sixth lens element that are adjacent to each other in the present disclosure for improving the problem generated by the cemented lens elements.

According to the optical imaging lens assembly of the present disclosure, the lens elements thereof can be made of glass or plastic material. When the lens elements are made of glass material, the distribution of the refractive power of the optical imaging lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical imaging lens assembly can also be reduced.

According to the optical imaging lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when the region of refractive power or focus of a lens element is not defined, it indicates that the region of refractive power or focus of the lens element is in the paraxial region thereof.

According to the optical imaging lens assembly of the present disclosure, an image surface of the optical imaging lens assembly, based on the corresponding image sensor, can be flat or curved, especially a curved surface being concave facing towards the object side of the optical imaging lens assembly.

According to the optical imaging lens assembly of the present disclosure, the optical imaging lens assembly can include at least one stop, such as an aperture stop, a glare stop or a field stop. Said glare stop or said field stop is set for eliminating the stray light and thereby improving the image quality thereof.

According to the optical imaging lens assembly of the present disclosure, an aperture stop can be configured as a front stop or a middle stop. A front stop disposed between an imaged object and the first lens element can provide a longer distance between an exit pupil of the optical imaging lens assembly and the image surface and thereby improves the image-sensing efficiency of an image sensor. A middle stop disposed between the first lens element and the image surface is favorable for enlarging the field of view of the optical imaging lens assembly and thereby provides a wider field of view for the same.

According to the present disclosure, an image capturing unit is provided. The image capturing unit includes the optical imaging lens assembly according to the aforementioned optical imaging lens assembly of the present disclosure, and an image sensor, wherein the image sensor is disposed on the image side of the aforementioned optical imaging lens assembly, that is, the image sensor can be disposed on or near an image surface of the aforementioned optical imaging lens assembly. In some embodiments, the image capturing unit can further include a barrel member, a holding member or a combination thereof.

Figure 17:
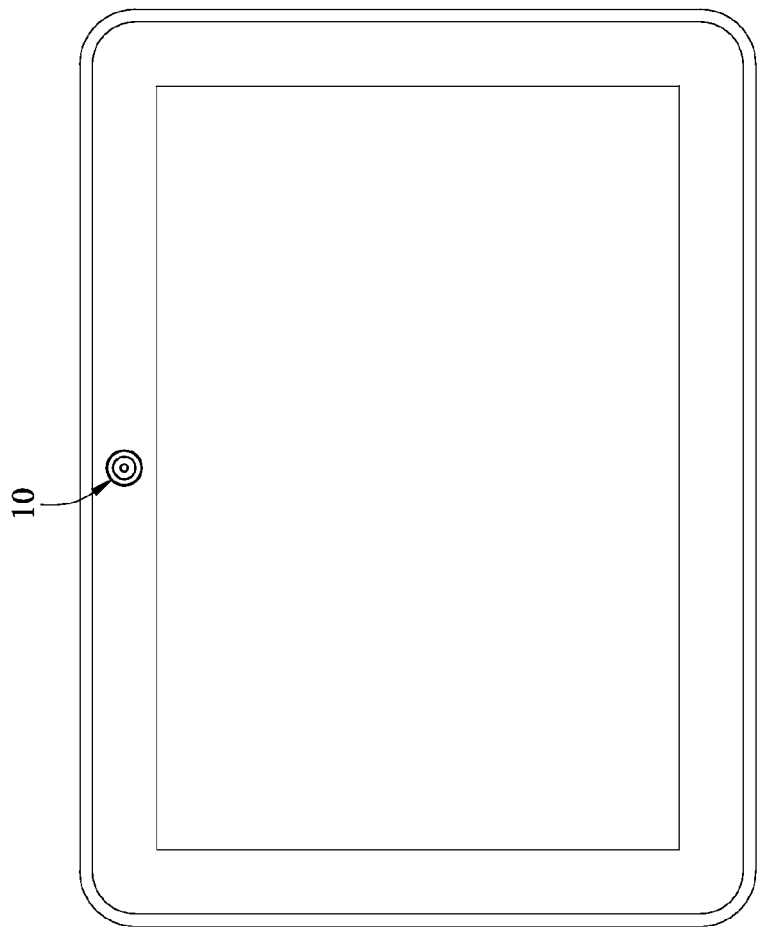
FIG. 17 shows an electronic device according to another embodiment.
Figure 16:
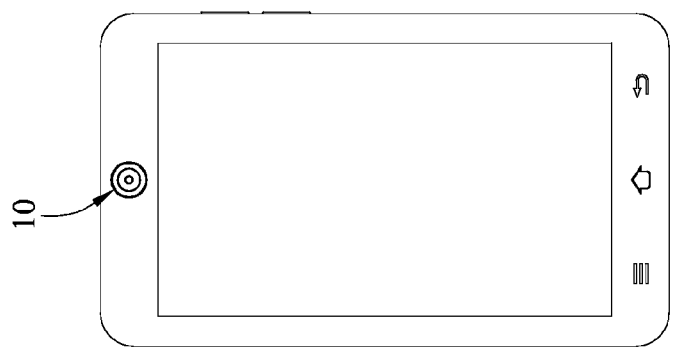
FIG. 16 shows an electronic device according to an embodiment.
Figure 18:
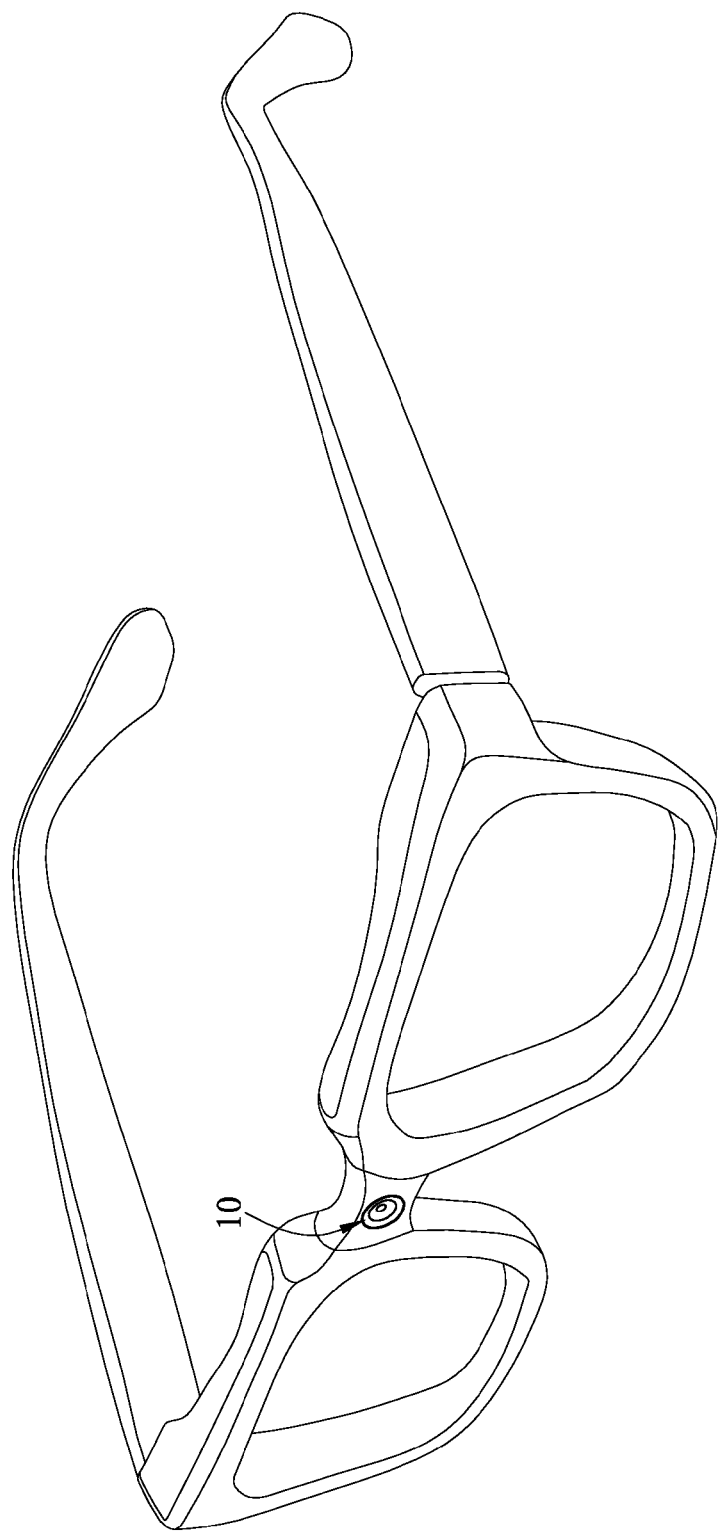
FIG. 18 shows an electronic device according to still another embodiment.

In FIG. 16, FIG. 17 and FIG. 18, an image capturing device 10 may be installed in, but not limited to, an electronic device, including a smart phone (FIG. 16), a tablet personal computer (FIG. 17) or a wearable device (FIG. 18). The three exemplary figures of different kinds of electronic device are only exemplary for showing the image capturing device of present disclosure installing in an electronic device and is not limited thereto. In some embodiments, the electronic device can further include, but not limited to, a display, a control unit, a random access memory unit (RAM), a read only memory unit (ROM) or a combination thereof.

According to the optical imaging lens assembly of the present disclosure, the optical imaging lens assembly can be optionally applied to moving focus optical systems. Furthermore, the optical imaging lens assembly is featured with good capability in corrections and high image quality, and can be applied to 3D (three-dimensional) image capturing applications, in products such as digital cameras, mobile devices, digital tablets, wearable devices, smart televisions, wireless monitoring devices, motion sensing input devices, driving recorders, rear view cameras and other electronic imaging devices. According to the above description of the present disclosure, the following specific embodiments are provided for further explanation.

1st Embodiment

Figure 2:
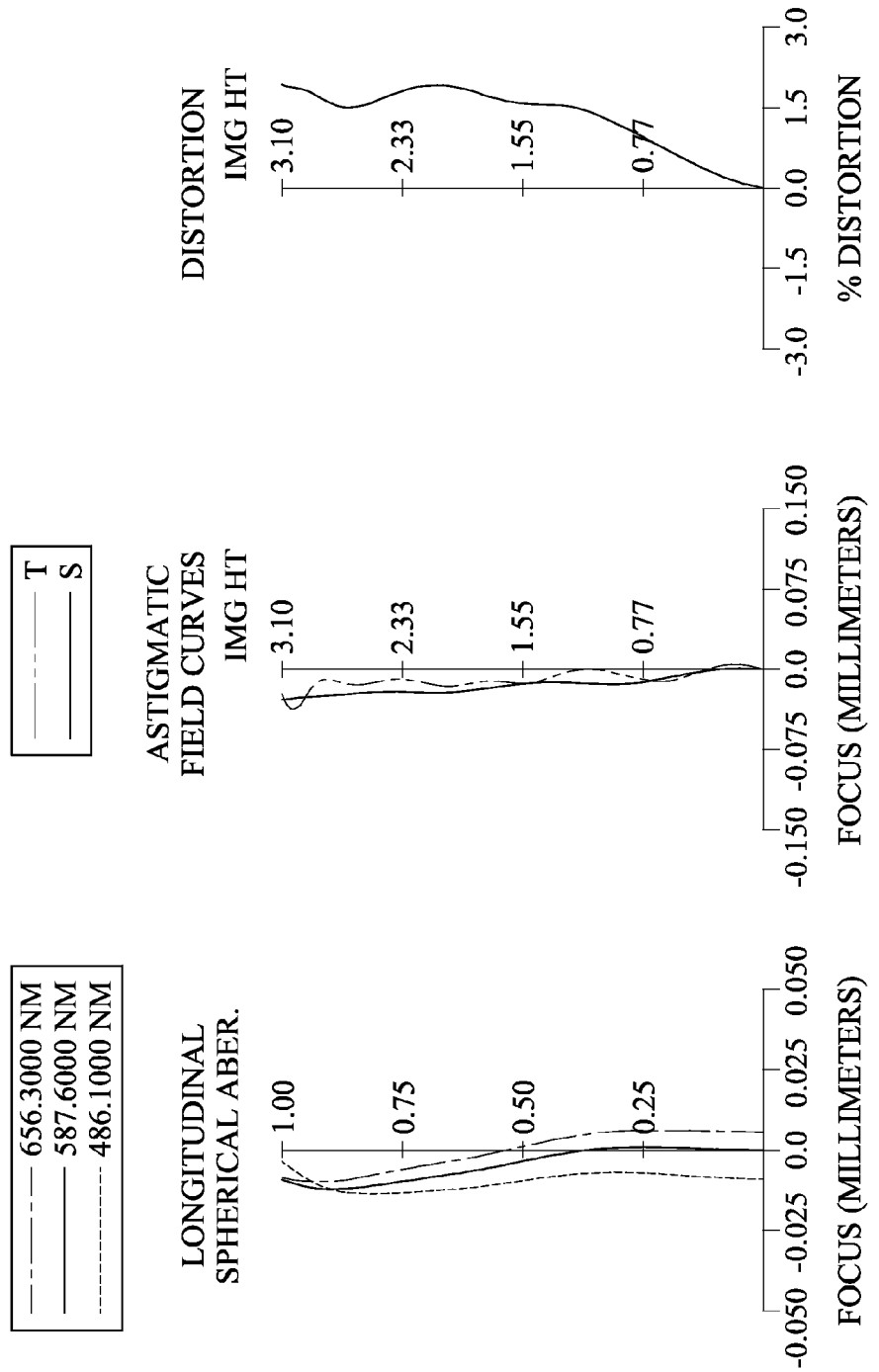
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 190. The optical imaging lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the optical imaging lens assembly has a total of six lens elements (110-160) with refractive power.

The first lens element 110 with positive refractive power in a paraxial region thereof has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power in a paraxial region thereof has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power in a paraxial region thereof has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power in a paraxial region thereof has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with positive refractive power in a paraxial region thereof has an object-side surface 151 being convex in a paraxial region thereof and an image-side surface 152 being concave in a paraxial region thereof. Both of the object-side surface 151 and the image-side surface 152 have at least one inflection point. The fifth lens element 150 is made of plastic material and has the object-side surface 151 and the image-side surface 152 being both aspheric.

The sixth lens element 160 with positive refractive power in a paraxial region thereof has an object-side surface 161 being convex in a paraxial region thereof and an image-side surface 162 being concave in a paraxial region thereof. The image-side surface 162 of the sixth lens element 160 has at least one convex shape in an off-axis region thereof. The sixth lens element 160 is made of plastic material and has the object-side surface 161 and the image-side surface 162 being both aspheric.

The IR-cut filter 170 is made of glass and located between the sixth lens element 160 and the image surface 180, and will not affect the focal length of the optical imaging lens assembly. The image sensor 190 is disposed on or near the image surface 180 of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

, where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens assembly of the image capturing unit according to the 1st embodiment, when a focal length of the optical imaging lens assembly in the paraxial region thereof is f, an f-number of the optical imaging lens assembly is Fno, and half of a maximal field of view of the optical imaging lens assembly is HFOV, these parameters have the following values: f=3.96 mm; Fno=2.15; and HFOV=37.5 degrees.

When an Abbe number of the second lens element 120 is V2, an Abbe number of the third lens element 130 is V3, an Abbe number of the fourth lens element 140 is V4, the following condition is satisfied: V2+V3+V4=102.90.

When an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, the following condition is satisfied: T23/(T12+T34+T45+T56)=1.66.

When the axial distance between the fourth lens element 140 and the fifth lens element 150 is T45, the axial distance between the fifth lens element 150 and the sixth lens element 160 is T56, an axial distance between the object-side surface 141 of the fourth lens element 140 and the image-side surface 162 of the sixth lens element 160 is Dr7r12, the following condition is satisfied: (T45+T56)/Dr7r12=0.07.

When a sum of axial distances between any two lens elements adjacent to each other is ΣAT, a sum of central thicknesses of the first lens element 110 through the sixth lens element 160 is ΣCT, the following condition is satisfied: ΣAT/ΣCT=0.41.

When an axial distance between the object-side surface 111 of the first lens element 110 and the image-side surface 162 of the sixth lens element 160 is Td, the following condition is satisfied: Td=3.78 mm.

When a curvature radius of the object-side surface 151 of the fifth lens element 150 is R9, a curvature radius of the image-side surface 152 of the fifth lens element 150 is R10, the following condition is satisfied: |R9/R10|=0.87.

When a focal length of the optical imaging lens assembly in the paraxial region thereof is f, a curvature radius of the image-side surface 122 of the second lens element 120 is R4, the following condition is satisfied: f/|R4|=1.51.

When a focal length of the third lens element 130 in the paraxial region thereof is f3, a focal length of the fourth lens element 140 in the paraxial region thereof is f4, a focal length of the sixth lens element 160 in the paraxial region thereof is f6, the following conditions is satisfied: f3*f4/f6=112.21.

When the focal length of the optical imaging lens assembly in the paraxial region thereof is f, the focal length of the third lens element 130 in the paraxial region thereof is f3, the focal length of the fourth lens element 140 in the paraxial region thereof is f4, a focal length of the fifth lens element 150 in the paraxial region thereof is f5, the focal length of the sixth lens element 160 in the paraxial region thereof is f6, the following condition is satisfied: |f/f3|+|f/f4|+|f/f5|+|f/f6|=0.41.

When the focal length of the optical imaging lens assembly in the paraxial region thereof is f, a vertical distance between a non-axial critical point on the image-side surface 162 of the sixth lens element 160 and an optical axis is Yc62, the following condition is satisfied: Yc62/f=0.35.

The detailed optical data of the 1st embodiment are shown in Table 1 and the aspheric surface data are shown in Table 2 below.

TABLE 1

1st Embodiment
f = 3.96 mm, Fno = 2.15, HFOV = 37.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.302 | | | | |
| 2 | Lens 1 | 1.549 (ASP) | 0.652 | Plastic | 1.544 | 55.9 | 2.89 |
| 3 | | 92.224 (ASP) | 0.050 | | | | |
| 4 | Lens 2 | 10.708 (ASP) | 0.241 | Plastic | 1.639 | 23.5 | −5.48 |
| 5 | | 2.615 (ASP) | 0.685 | | | | |
| 6 | Lens 3 | 3.429 (ASP) | 0.240 | Plastic | 1.639 | 23.5 | −58.18 |
| 7 | | 3.054 (ASP) | 0.244 | | | | |
| 8 | Lens 4 | −5.954 (ASP) | 0.499 | Plastic | 1.544 | 55.9 | −41.62 |
| 9 | | −8.317 (ASP) | 0.048 | | | | |
| 10 | Lens 5 | 4.928 (ASP) | 0.280 | Plastic | 1.544 | 55.9 | 62.64 |
| 11 | | 5.646 (ASP) | 0.070 | | | | |
| 12 | Lens 6 | 1.457 (ASP) | 0.769 | Plastic | 1.514 | 56.8 | 21.58 |
| 13 | | 1.378 (ASP) | 0.500 | | | | |
| 14 | IR-cut filter | Plano | 0.300 | Glass | 1.517 | 64.2 | — |
| 15 | | Plano | 0.275 | | | | |
| 16 | Image | Plano | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | 4.4313E−01 | −1.0000E+00 | −1.0000E+00 | −8.6589E+00 | 3.0000E+00 | −1.9961E+01 |
| A4 = | −1.2788E−02 | −2.5141E−02 | −5.7678E−02 | 4.7420E−02 | −1.2154E−01 | −1.9403E−02 |
| A6 = | 1.8539E−03 | 5.8918E−02 | 1.2557E−01 | 7.4536E−02 | −3.9719E−02 | −1.8838E−01 |
| A8 = | −1.6492E−02 | 7.2414E−03 | −5.5608E−02 | −7.6446E−02 | 1.3118E−01 | 3.6968E−01 |
| A10 = | −7.0661E−03 | −1.6500E−01 | −1.3466E−01 | 1.3383E−01 | −2.3966E−01 | −4.4923E−01 |
| A12 = | 3.5734E−02 | 1.2746E−01 | 1.1268E−01 | −1.8561E−01 | 1.6573E−01 | 3.1065E−01 |
| A14 = | −3.2619E−02 | −3.4693E−02 | −9.7432E−03 | 1.2730E−01 | −4.0570E−02 | −1.1476E−01 |
| A16 = | 6.3128E−05 | 2.3041E−05 | −2.5159E−05 | 7.4997E−04 | −5.1279E−03 | 1.7666E−02 |

| Surface # | 8 | 9 | 10 | 11 | 12 | 13 |
|---|---|---|---|---|---|---|
| k = | −1.2633E+01 | 2.7874E+00 | −4.6368E+00 | −1.9334E+01 | −4.1293E+00 | −1.5210E+00 |
| A4 = | −6.4412E−02 | −3.8931E−01 | 8.7979E−02 | 3.1275E−01 | −1.6025E−01 | −1.8371E−01 |
| A6 = | −1.9272E−01 | 2.8671E−01 | −3.3681E−01 | −5.6877E−01 | −1.0928E−02 | 5.7918E−02 |
| A8 = | 3.7461E−01 | −1.0535E−01 | 3.6119E−01 | 4.4528E−01 | 3.1668E−02 | −1.0040E−02 |
| A10 = | −2.6436E−01 | 3.3465E−02 | −2.1145E−01 | −2.0855E−01 | −1.0067E−02 | 1.1001E−03 |
| A12 = | 9.5975E−02 | −1.0912E−02 | 6.5865E−02 | 5.6912E−02 | 1.4906E−03 | −1.4887E−04 |
| A14 = | −1.8028E−02 | 2.4546E−03 | −1.0164E−02 | −8.1822E−03 | −1.1046E−04 | 1.8862E−05 |
| A16 = | 1.3788E−03 | −2.3900E−04 | 6.1206E−04 | 4.7624E−04 | 3.3015E−06 | −9.5413E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
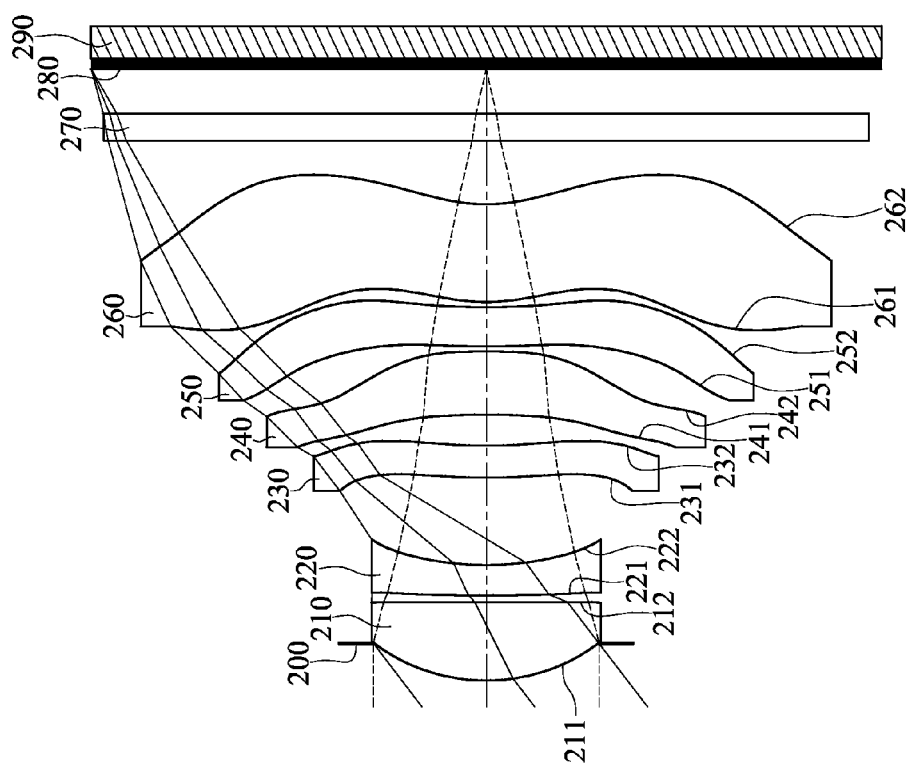
FIG. 3 is a schematic view of an image capturing unit according to the 2nd embodiment of the present disclosure.
Figure 4:
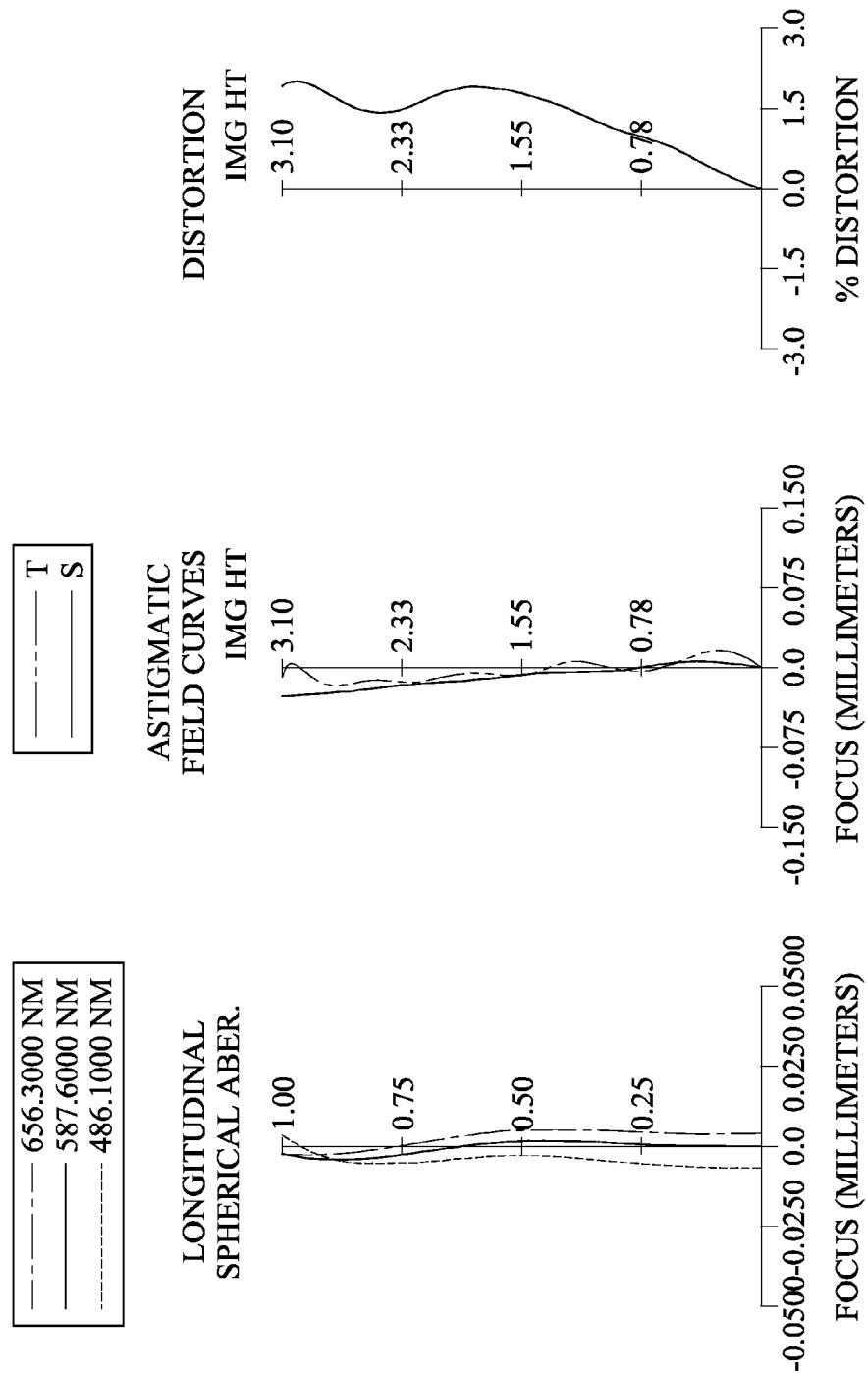
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 290. The optical imaging lens assembly includes, in order from an object side to an image side an aperture stop 200, a first lens element 210, a second lens element 220, a third lens element 230, a fourth lens element 240, a fifth lens element 250, a sixth lens element 260, an IR-cut filter 270 and an image surface 280, wherein the optical imaging lens assembly has a total of six lens elements (210-260) with refractive power.

The first lens element 210 with positive refractive power in a paraxial region thereof has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power in a paraxial region thereof has an object-side surface 221 being convex in a paraxial region thereof and an image-side surface 222 being concave in a paraxial region thereof.

The second lens element 220 is made of plastic material and has the object-side surface 221 and the image-side surface 222 being both aspheric.

The third lens element 230 with negative refractive power in a paraxial region thereof has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with negative refractive power in a paraxial region thereof has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power in a paraxial region thereof has an object-side surface 251 being convex in a paraxial region thereof and an image-side surface 252 being concave in a paraxial region thereof. Both of the object-side surface 251 and the image-side surface 252 have at least one inflection point. The fifth lens element 250 is made of plastic material and has the object-side surface 251 and the image-side surface 252 being both aspheric.

The sixth lens element 260 with positive refractive power in a paraxial region thereof has an object-side surface 261 being convex in a paraxial region thereof and an image-side surface 262 being concave in a paraxial region thereof. The image-side surface 262 of the sixth lens element 260 has at least one convex shape in an off-axis region thereof. The sixth lens element 260 is made of plastic material and has the object-side surface 261 and the image-side surface 262 being both aspheric.

The IR-cut filter 270 is made of glass and located between the sixth lens element 260 and the image surface 280, and will not affect the focal length of the optical imaging lens assembly. The image sensor 290 is disposed on or near the image surface 280 of the optical imaging lens assembly.

The detailed optical data of the 2nd embodiment are shown in Table 3 and the aspheric surface data are shown in Table 4 below.

TABLE 3

2nd Embodiment
f = 3.98 mm, Fno = 2.25, HFOV = 37.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.292 | | | | |
| 2 | Lens 1 | 1.496 (ASP) | 0.617 | Plastic | 1.535 | 55.7 | 2.73 |
| 3 | | −54.298 (ASP) | 0.050 | | | | |
| 4 | Lens 2 | 12.529 (ASP) | 0.240 | Plastic | 1.639 | 23.5 | −4.97 |
| 5 | | 2.516 (ASP) | 0.685 | | | | |
| 6 | Lens 3 | 4.319 (ASP) | 0.251 | Plastic | 1.639 | 23.5 | −58.41 |
| 7 | | 3.784 (ASP) | 0.245 | | | | |
| 8 | Lens 4 | −5.854 (ASP) | 0.496 | Plastic | 1.544 | 55.9 | −39.18 |
| 9 | | −8.311 (ASP) | 0.040 | | | | |
| 10 | Lens 5 | 7.409 (ASP) | 0.308 | Plastic | 1.535 | 55.7 | 68.96 |
| 11 | | 9.136 (ASP) | 0.040 | | | | |
| 12 | Lens 6 | 1.457 (ASP) | 0.767 | Plastic | 1.535 | 55.7 | 30.82 |
| 13 | | 1.306 (ASP) | 0.500 | | | | |
| 14 | IR-cut filter | Plano | 0.210 | Glass | 1.517 | 64.2 | — |
| 15 | | Plano | 0.353 | | | | |
| 16 | Image | Plano | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | 1.4407E−02 | −1.0000E+00 | 3.0000E+00 | −1.1013E+01 | 3.0000E+00 | −1.9597E+01 |
| A4 = | 5.0801E−03 | 4.6287E−03 | −3.7512E−02 | 6.8583E−02 | −1.2159E−01 | −3.9401E−02 |
| A6 = | 1.4747E−03 | 5.6160E−02 | 1.1372E−01 | 6.6117E−02 | −4.5603E−02 | −2.1806E−01 |
| A8 = | 2.6373E−02 | −3.9196E−02 | −8.5928E−02 | −1.1675E−01 | 1.5637E−01 | 4.6308E−01 |
| A10 = | −6.4353E−02 | −7.5029E−02 | −9.6609E−02 | 2.4266E−01 | −2.5202E−01 | −5.4856E−01 |
| A12 = | 8.7012E−02 | 5.2762E−02 | 9.9823E−02 | −3.0976E−01 | 1.6810E−01 | 3.6961E−01 |
| A14 = | −4.8978E−02 | −1.6556E−02 | −1.6664E−02 | 1.9883E−01 | −4.0399E−02 | −1.3196E−01 |
| A16 = | −1.0405E−04 | 3.8942E−04 | −5.3943E−04 | −3.9968E−04 | −2.6875E−03 | 1.9623E−02 |

| Surface # | 8 | 9 | 10 | 11 | 12 | 13 |
|---|---|---|---|---|---|---|
| k = | −1.9872E+01 | 2.9413E+00 | −4.3467E+00 | −1.9164E+01 | −8.1916E+00 | −4.2210E+00 |
| A4 = | 1.5387E−03 | −4.7618E−01 | −6.3909E−02 | 2.0035E−01 | −1.3694E−01 | −1.2122E−01 |
| A6 = | −3.0147E−01 | 4.6516E−01 | −1.5279E−01 | −3.9777E−01 | −1.4176E−02 | 4.7816E−02 |
| A8 = | 4.2122E−01 | −3.5261E−01 | 2.2161E−01 | 2.8064E−01 | 3.1261E−02 | −1.1983E−02 |
| A10 = | −2.4358E−01 | 2.4524E−01 | −1.3142E−01 | −1.0728E−01 | −9.9336E−03 | 1.5277E−03 |
| A12 = | 7.6153E−02 | −1.0697E−01 | 3.9082E−02 | 2.3318E−02 | 1.4830E−03 | −8.7662E−05 |

TABLE 4-continued

| Aspheric Coefficients | | | | | |
|---|---|---|---|---|---|
| A14 = −1.5066E−02 | 2.3787E−02 | −5.7009E−03 | −2.7291E−03 | −1.1055E−04 | 2.2840E−06 |
| A16 = 1.6533E−03 | −2.0834E−03 | 3.2435E−04 | 1.3482E−04 | 3.3033E−06 | −7.8266E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.98 | Td [mm] | 3.74 |
| Fno | 2.25 | |R9/R10| | 0.81 |
| HFOV [deg.] | 37.4 | f/|R4| | 1.58 |
| V2 + V3 + V4 | 102.90 | f3 * f4/f6 | 74.25 |
| T23/(T12 + T34 + T45 + T56) | 1.83 | |f/f3| + |f/f4| + |f/f5| + |f/f6| | 0.36 |
| (T45 + T56)/Dr7r12 | 0.05 | Yc62/f | 0.34 |
| ΣAT/ΣCT | 0.40 | | |

3rd Embodiment

Figure 5:
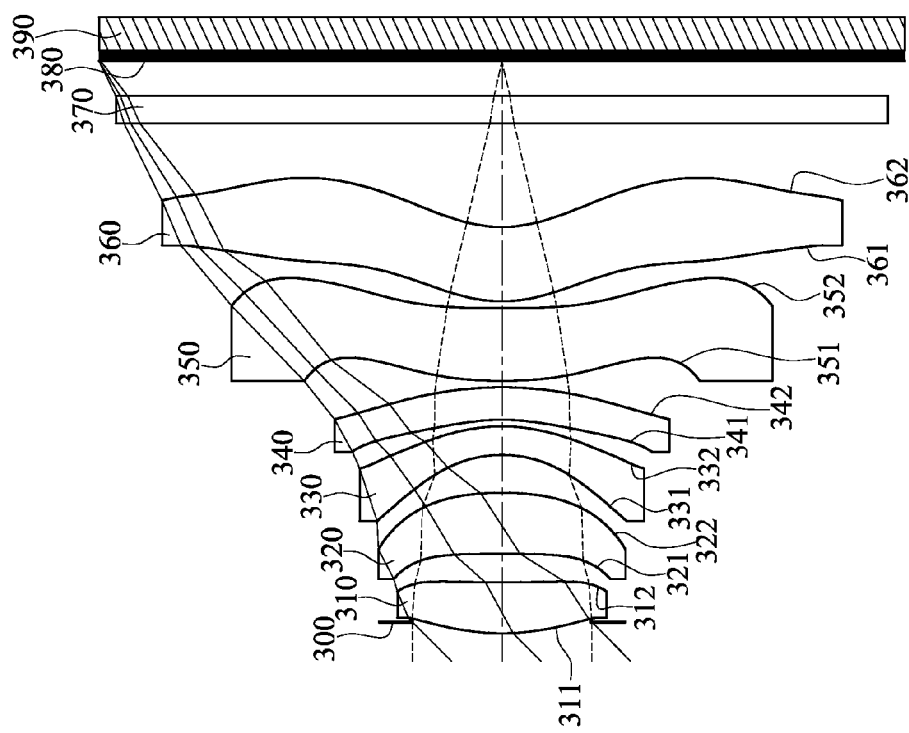
FIG. 5 is a schematic view of an image capturing unit according to the 3rd embodiment of the present disclosure.
Figure 6:
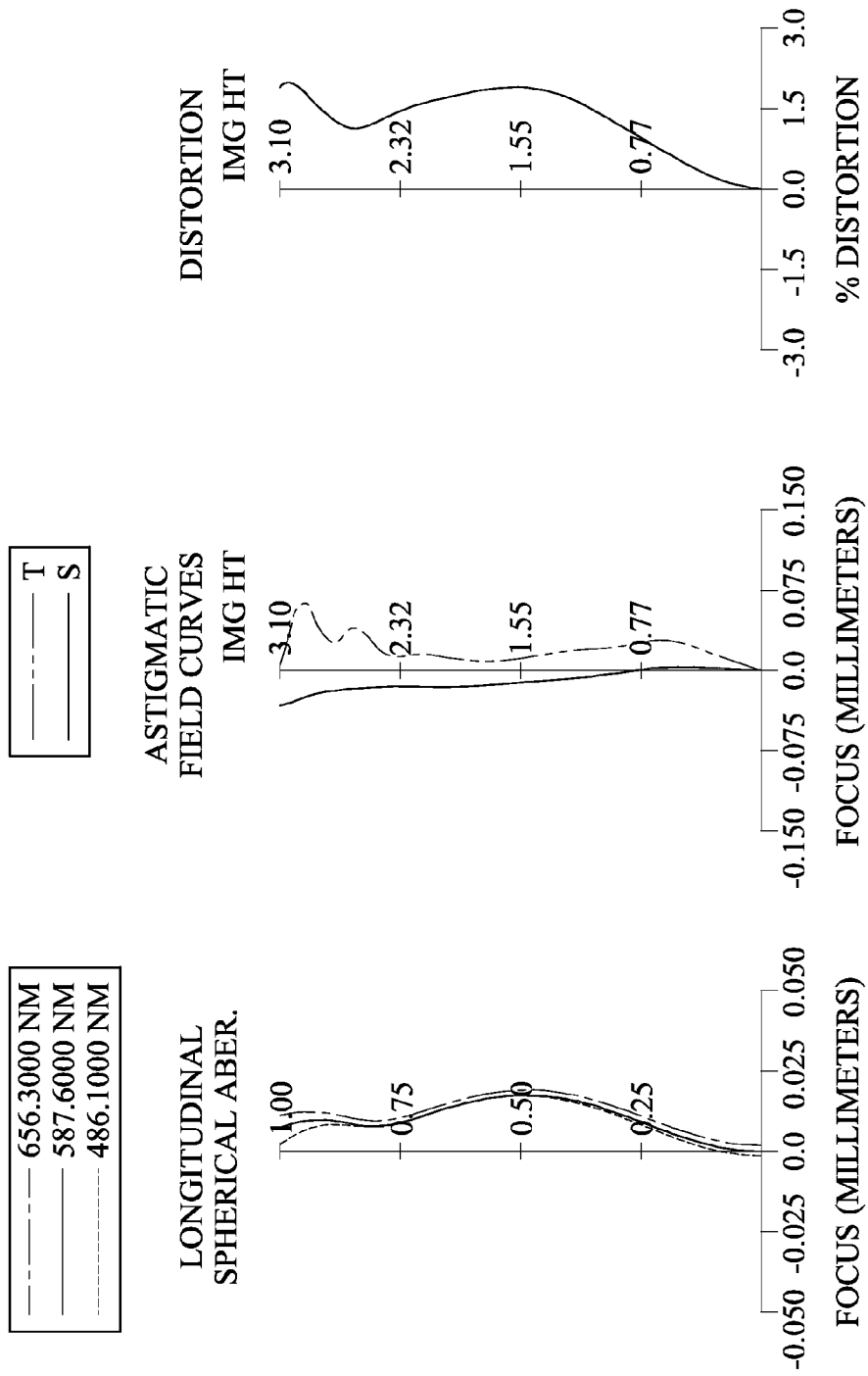
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 390. The optical imaging lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the optical imaging lens assembly has a total of six lens elements (310-360) with refractive power.

The first lens element 310 with positive refractive power in a paraxial region thereof has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power in a paraxial region thereof has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power in a paraxial region thereof has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power in a paraxial region thereof has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power in a paraxial region thereof has an object-side surface 351 being convex in a paraxial region thereof and an image-side surface 352 being concave in a paraxial region thereof. Both of the object-side surface 351 and the image-side surface 352 have at least one inflection point. The fifth lens element 350 is made of plastic material and has the object-side surface 351 and the image-side surface 352 being both aspheric.

The sixth lens element 360 with positive refractive power in a paraxial region thereof has an object-side surface 361 being convex in a paraxial region thereof and an image-side surface 362 being concave in a paraxial region thereof. The image-side surface 362 of the sixth lens element 360 has at least one convex shape in an off-axis region thereof. The sixth lens element 360 is made of plastic material and has the object-side surface 361 and the image-side surface 362 being both aspheric.

The IR-cut filter 370 is made of glass and located between the sixth lens element 360 and the image surface 380, and will not affect the focal length of the optical imaging lens assembly. The image sensor 390 is disposed on or near the image surface 380 of the optical imaging lens assembly.

The detailed optical data of the 3rd embodiment are shown in Table 5 and the aspheric surface data are shown in Table 6 below.

TABLE 5

3rd Embodiment
f = 3.03 mm, Fno = 2.20, HFOV = 45.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.088 | | | | |
| 2 | Lens 1 | 1.848 (ASP) | 0.391 | Plastic | 1.544 | 55.9 | 4.41 |
| 3 | | 7.428 (ASP) | 0.221 | | | | |
| 4 | Lens 2 | −14.489 (ASP) | 0.470 | Plastic | 1.544 | 55.9 | 4.63 |
| 5 | | −2.171 (ASP) | 0.291 | | | | |
| 6 | Lens 3 | −0.939 (ASP) | 0.220 | Plastic | 1.650 | 21.5 | −6.47 |

TABLE 5-continued

3rd Embodiment
f = 3.03 mm, Fno = 2.20, HFOV = 45.0 deg.

| Surface # | | Curvature Radius | Thickness | Material | Index | Abbe # | Focal Length |
|---|---|---|---|---|---|---|---|
| 7 | | −1.321 (ASP) | 0.050 | | | | |
| 8 | Lens 4 | −1.583 (ASP) | 0.250 | Plastic | 1.650 | 21.5 | −6.29 |
| 9 | | −2.743 (ASP) | 0.050 | | | | |
| 10 | Lens 5 | 3.800 (ASP) | 0.562 | Plastic | 1.544 | 55.9 | 7.25 |
| 11 | | 98.478 (ASP) | 0.050 | | | | |
| 12 | Lens 6 | 1.055 (ASP) | 0.572 | Plastic | 1.535 | 55.7 | 14.18 |
| 13 | | 0.994 (ASP) | 0.800 | | | | |
| 14 | IR-cut filter | Plano | 0.210 | Glass | 1.517 | 64.2 | — |
| 15 | | Plano | 0.267 | | | | |
| 16 | Image | Plano | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | 5.1837E−01 | 7.4377E+01 | −7.3515E+01 | 2.4941E+00 | −1.1529E+00 | −2.7527E+00 |
| A4 = | −4.9615E−02 | −1.2220E−01 | −1.6209E−01 | −1.4057E−01 | −3.6734E−01 | 5.0239E−02 |
| A6 = | −3.5021E−02 | −2.0567E−01 | −1.6268E−01 | −1.3161E−01 | 1.1861E+00 | −2.1587E−01 |
| A8 = | −2.5732E−01 | −5.5104E−03 | −1.7165E−01 | 9.9381E−02 | −3.6565E+00 | 5.6680E−01 |
| A10 = | 6.1875E−01 | −2.3219E−01 | −2.1658E−01 | −9.1550E−02 | 8.5966E+00 | −6.3316E−01 |
| A12 = | −1.1174E+00 | −7.3509E−02 | 2.7932E−01 | 2.0787E−01 | −1.1505E+01 | 3.1138E−01 |
| A14 = | 3.8876E−01 | 1.3390E−01 | 9.3622E−02 | −1.2188E−01 | 7.7484E+00 | −8.2249E−02 |
| A16 = | 6.4460E−11 | 1.1660E−09 | −1.9379E−09 | −6.0509E−02 | −2.0293E+00 | 2.5151E−02 |

| Surface # | 8 | 9 | 10 | 11 | 12 | 13 |
|---|---|---|---|---|---|---|
| k = | −1.6507E+01 | −3.4968E+01 | −1.4396E+00 | −9.9000E+01 | −1.3755E+00 | −1.5931E+00 |
| A4 = | 8.4661E−03 | −1.4758E−01 | 2.2742E−01 | 2.3175E−01 | −2.4282E−01 | −2.1656E−01 |
| A6 = | 3.3039E−02 | 1.6223E−01 | −4.3838E−01 | −1.6887E−01 | 5.2150E−02 | 9.0860E−02 |
| A8 = | −5.4150E−02 | −1.5046E−01 | 4.6676E−01 | 4.9290E−02 | 1.3316E−02 | −2.6708E−02 |
| A10 = | 1.3013E−02 | 1.2644E−01 | −3.5699E−01 | −3.2356E−03 | −8.5351E−03 | 5.1404E−03 |
| A12 = | 5.4106E−04 | −6.1084E−02 | 1.6968E−01 | −1.5908E−03 | 1.6827E−03 | −5.8790E−04 |
| A14 = | −3.0549E−04 | 1.1363E−02 | −4.4437E−02 | 3.5694E−04 | −1.5155E−04 | 3.6340E−05 |
| A16 = | −1.6461E−03 | 7.5347E−05 | 4.8103E−03 | −2.2214E−05 | 5.2762E−06 | −9.6072E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.03 | Td [mm] | 3.13 |
| Fno | 2.20 | |R9/R10| | 0.04 |
| HFOV [deg.] | 45.0 | f/|R4| | 1.40 |
| V2 + V3 + V4 | 98.90 | f3 * f4/f6 | 2.87 |
| T23/(T12 + T34 + T45 + T56) | 0.78 | |f/f3| + |f/f4| + |f/f5| + |f/f6| | 1.58 |
| (T45 + T56)/Dr7r12 | 0.07 | Yc62/f | 0.50 |
| ΣAT/ΣCT | 0.27 | | |

4th Embodiment

Figure 7:
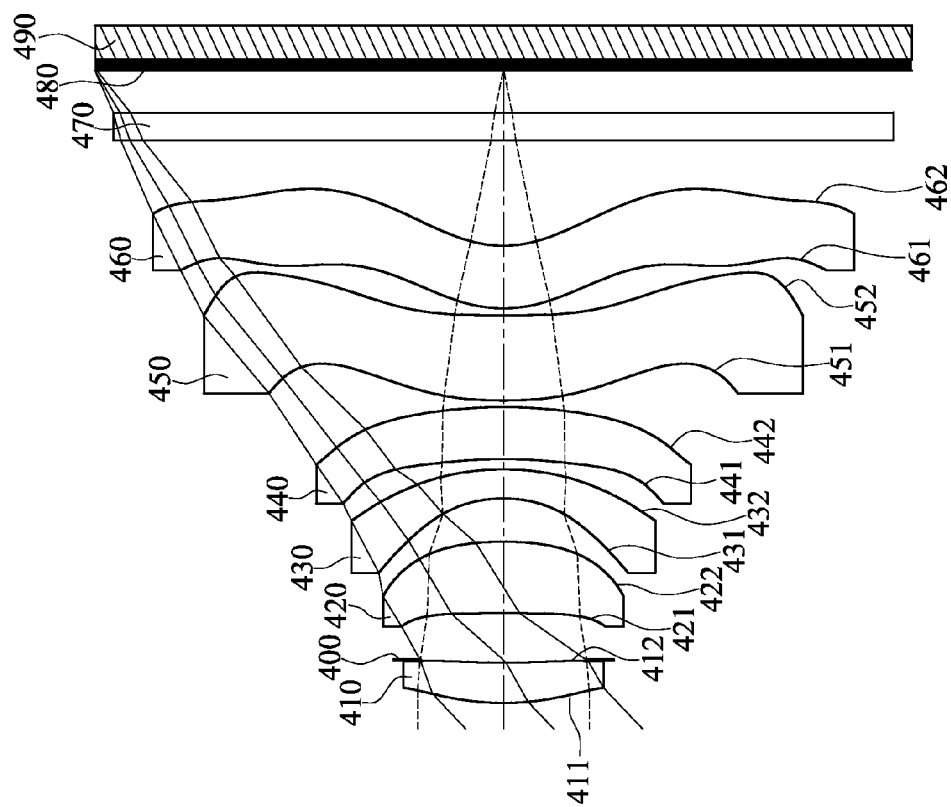
FIG. 7 is a schematic view of an image capturing unit according to the 4th embodiment of the present disclosure.
Figure 8:
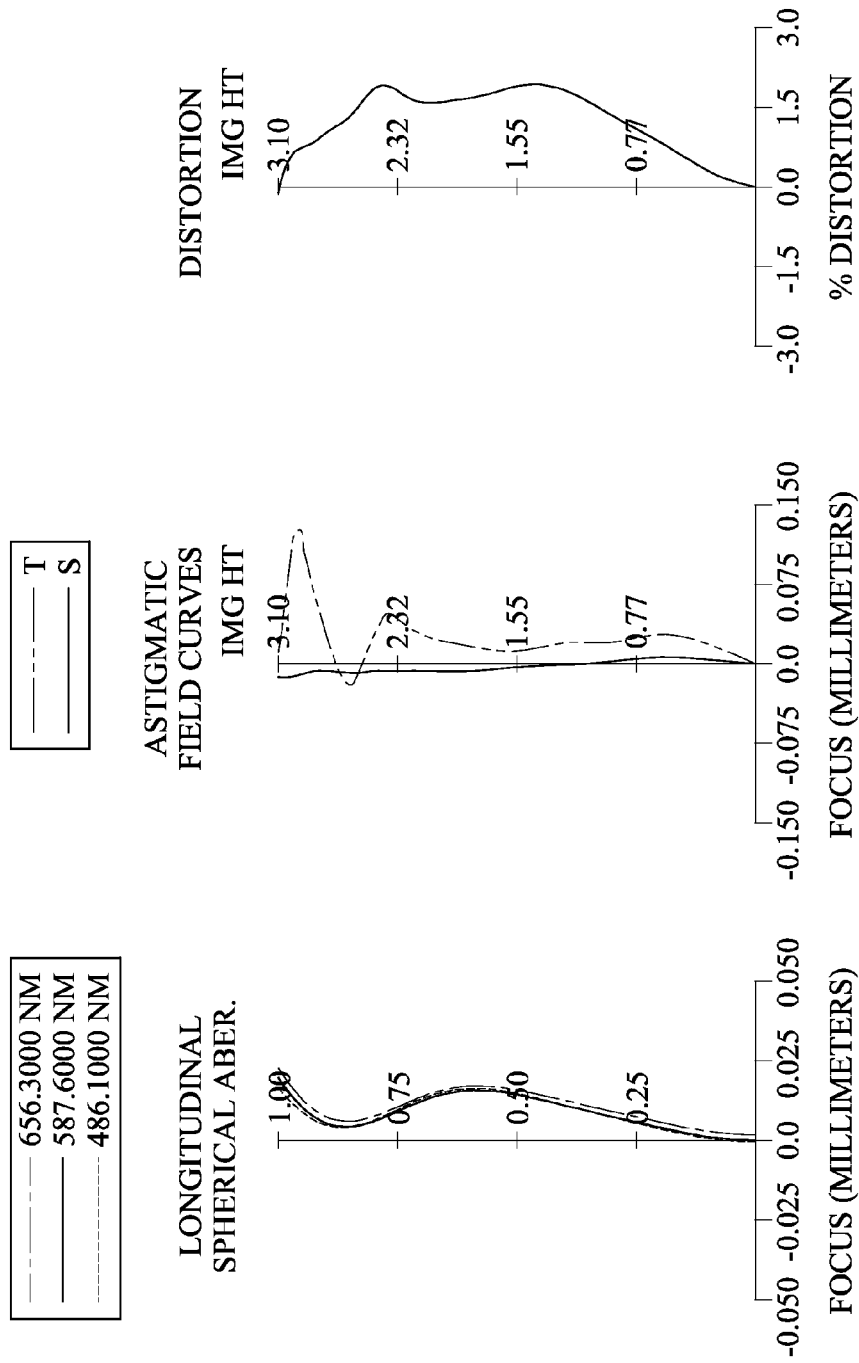
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 490. The optical imaging lens assembly includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image surface 480, wherein the optical imaging lens assembly has a total of six lens elements (410-460) with refractive power.

The first lens element 410 with positive refractive power in a paraxial region thereof has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power in a paraxial region thereof has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power in a paraxial region thereof has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power in a paraxial region thereof has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power in a paraxial region thereof has an object-side surface 451 being convex in a paraxial region thereof and an image-side surface 452 being concave in a paraxial region thereof. Both of the object-side surface 451 and the image-side surface 452 have at least one inflection point. The fifth lens element 450 is made of plastic material and has the object-side surface 451 and the image-side surface 452 being both aspheric.

The sixth lens element 460 with positive refractive power in a paraxial region thereof has an object-side surface 461 being convex in a paraxial region thereof and an image-side surface 462 being concave in a paraxial region thereof. The image-side surface 462 of the sixth lens element 460 has at least one convex shape in an off-axis region thereof. The sixth lens element 460 is made of plastic material and has the object-side surface 461 and the image-side surface 462 being both aspheric.

The IR-cut filter 470 is made of glass and located between the sixth lens element 460 and the image surface 480, and will not affect the focal length of the optical imaging lens assembly. The image sensor 490 is disposed on or near the image surface 480 of the optical imaging lens assembly.

The detailed optical data of the 4th embodiment are shown in Table 7 and the aspheric surface data are shown in Table 8 below.

TABLE 7

4th Embodiment
f = 3.25 mm, Fno = 2.50, HFOV = 43.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.958 (ASP) | 0.307 | Plastic | 1.544 | 55.9 | 5.06 |
| 2 | | 6.386 (ASP) | 0.019 | | | | |
| 3 | Ape. Stop | Plano | 0.357 | | | | |
| 4 | Lens 2 | −31.534 (ASP) | 0.543 | Plastic | 1.544 | 55.9 | 4.43 |
| 5 | | −2.254 (ASP) | 0.328 | | | | |
| 6 | Lens 3 | −1.011 (ASP) | 0.220 | Plastic | 1.650 | 21.5 | −3.37 |
| 7 | | −2.039 (ASP) | 0.079 | | | | |
| 8 | Lens 4 | −3.244 (ASP) | 0.394 | Plastic | 1.650 | 21.5 | −37.07 |
| 9 | | −3.927 (ASP) | 0.050 | | | | |
| 10 | Lens 5 | 3.397 (ASP) | 0.649 | Plastic | 1.544 | 55.9 | 6.45 |
| 11 | | 98.478 (ASP) | 0.050 | | | | |
| 12 | Lens 6 | 0.955 (ASP) | 0.476 | Plastic | 1.535 | 55.7 | 23.12 |
| 13 | | 0.855 (ASP) | 0.800 | | | | |
| 14 | IR-cut filter | Plano | 0.210 | Glass | 1.517 | 64.2 | — |
| 15 | | Plano | 0.321 | | | | |
| 16 | Image | Plano | — | | | | |

Note:
Reference wavelength is 587.6 nm (d-line).

TABLE 8

Aspheric Coefficients

| Surface # | 1 | 2 | 4 | 5 | 6 | 7 |
|---|---|---|---|---|---|---|
| k = | 1.0152E+00 | −2.5980E+01 | −9.9000E+01 | 4.3940E+00 | −4.6676E−01 | 5.6162E−01 |
| A4 = | −6.7306E−02 | −7.6339E−02 | −1.1747E−01 | −1.3914E−01 | −3.1798E−01 | −6.2993E−03 |
| A6 = | 7.1965E−02 | −1.5721E−04 | −1.5372E−01 | −1.5880E−01 | 5.7627E−01 | −2.3603E−01 |
| A8 = | −1.2089E+00 | −4.5073E−01 | 1.5794E−01 | 2.3320E−01 | −2.2446E+00 | 5.9948E−01 |
| A10 = | 5.0922E+00 | 5.8998E−02 | −7.8969E−01 | −2.2279E−01 | 7.3496E+00 | −6.0101E−01 |
| A12 = | −1.2444E+01 | 3.2538E+00 | 9.1770E−01 | 9.8433E−02 | −1.1578E+01 | 3.0581E−01 |
| A14 = | 1.5073E+01 | −8.4582E+00 | −6.7103E−01 | −1.6554E−02 | 8.7089E+00 | −9.6591E−02 |
| A16 = | −7.2726E+00 | 6.8855E+00 | −2.1157E−09 | −1.2672E−02 | −2.5453E+00 | 2.0798E−02 |

| Surface # | 8 | 9 | 10 | 11 | 12 | 13 |
|---|---|---|---|---|---|---|
| k = | −5.3234E+01 | −1.7959E+00 | −1.0324E+01 | −9.8495E+01 | −1.4676E+00 | −1.6170E+00 |
| A4 = | −1.7524E−02 | −7.7093E−02 | 2.4329E−01 | 2.5046E−01 | −1.8382E−01 | −2.0556E−01 |
| A6 = | 9.7297E−02 | 1.8720E−01 | −3.2859E−01 | −1.8906E−01 | 4.0079E−03 | 7.3032E−02 |
| A8 = | −2.9143E−01 | −3.5569E−01 | 2.6657E−01 | 7.8008E−02 | 1.5013E−02 | −1.9724E−02 |
| A10 = | 2.4452E−01 | 3.4683E−01 | −1.5338E−01 | −2.3576E−02 | −1.4389E−03 | 3.8671E−03 |
| A12 = | −8.1919E−02 | −2.0305E−01 | 5.4760E−02 | 5.3855E−03 | −5.7787E−04 | −4.3938E−04 |
| A14 = | −2.6523E−02 | 6.4264E−02 | −1.0768E−02 | −7.6036E−04 | 1.1737E−04 | 2.3446E−05 |
| A16 = | 1.9004E−02 | −8.1084E−03 | 8.8288E−04 | 4.5012E−05 | −6.0728E−06 | −3.8793E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.25 | Td [mm] | 3.47 |
| Fno | 2.50 | |R9/R10| | 0.03 |
| HFOV [deg.] | 43.6 | f/|R4| | 1.44 |
| V2 + V3 + V4 | 98.90 | f3 * f4/f6 | 5.40 |
| T23/(T12 + T34 + T45 + T56) | 0.59 | |f/f3| + |f/f4| + |f/f5| + |f/f6| | 1.70 |
| (T45 + T56)/Dr7r12 | 0.06 | Yc62/f | 0.45 |
| ΣAT/ΣCT | 0.34 | | |

5th Embodiment

Figure 9:
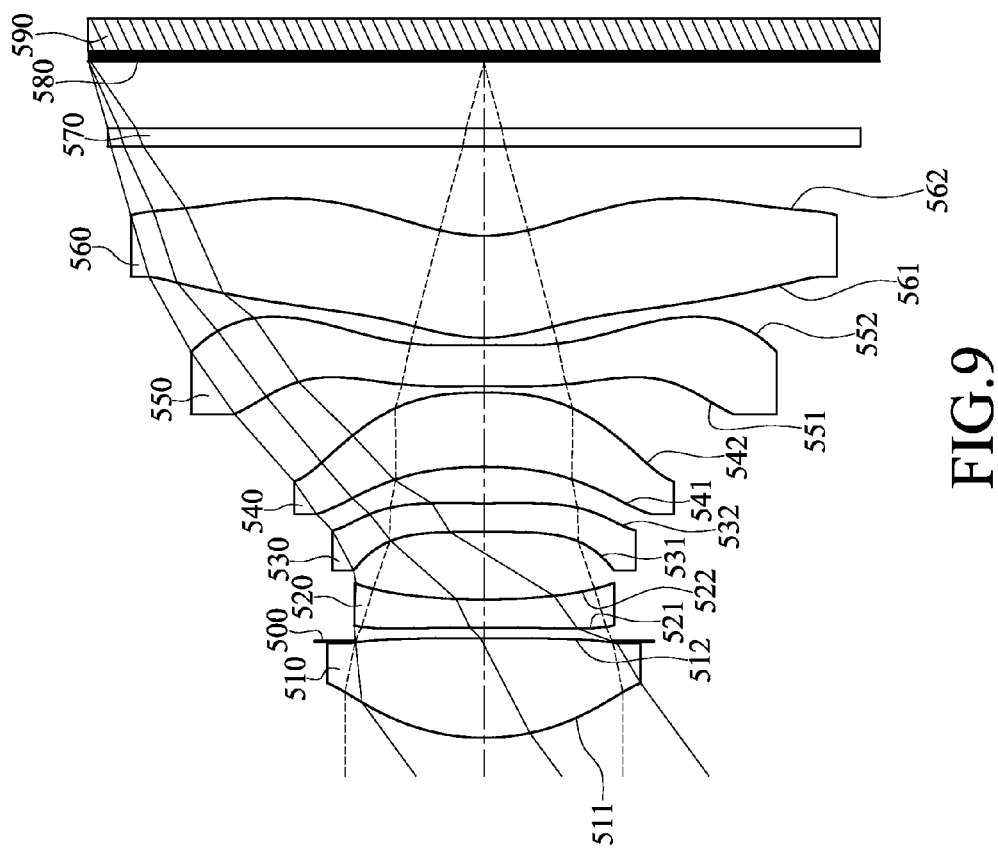
FIG. 9 is a schematic view of an image capturing unit according to the 5th embodiment of the present disclosure.
Figure 10:
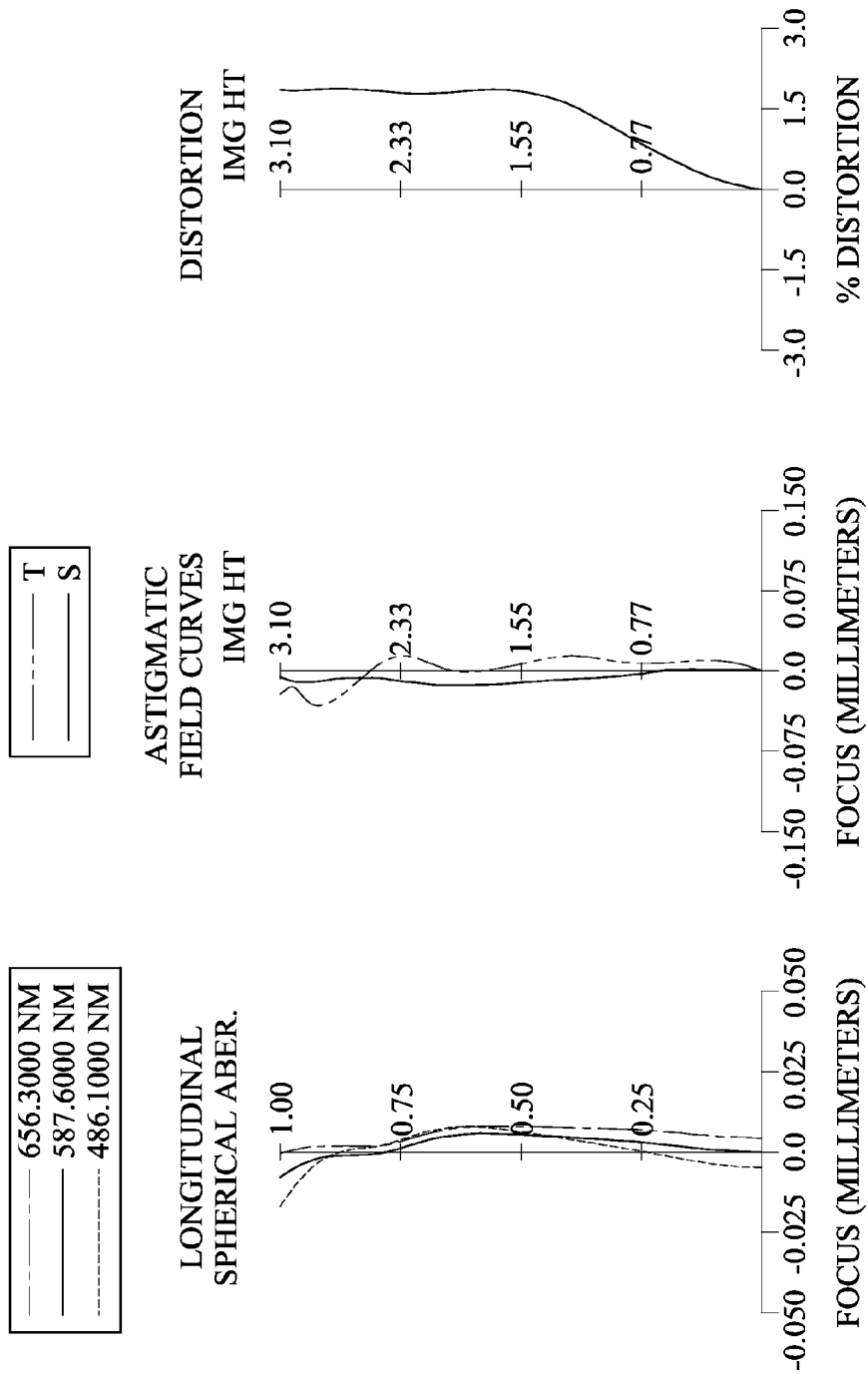
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 590. The optical imaging lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580, wherein the optical imaging lens assembly has a total of six lens elements (510-560) with refractive power.

The first lens element 510 with positive refractive power in a paraxial region thereof has an object-side surface 511 being convex in a paraxial region thereof and an image-side surface 512 being concave in a paraxial region thereof. The first lens element 510 is made of glass material and has the object-side surface 511 and the image-side surface 512 being both aspheric.

The second lens element 520 with negative refractive power in a paraxial region thereof has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power in a paraxial region thereof has an object-side surface 531 being concave in a paraxial region thereof and an image-side surface 532 being concave in a paraxial region thereof. The third lens element 530 is made of plastic material and has the object-side surface 531 and the image-side surface 532 being both aspheric.

The fourth lens element 540 with negative refractive power in a paraxial region thereof has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power in a paraxial region thereof has an object-side surface 551 being concave in a paraxial region thereof and an image-side surface 552 being convex in a paraxial region thereof. Both of the object-side surface 551 and the image-side surface 552 have at least one inflection point. The fifth lens element 550 is made of plastic material and has the object-side surface 551 and the image-side surface 552 being both aspheric.

The sixth lens element 560 with positive refractive power in a paraxial region thereof has an object-side surface 561 being convex in a paraxial region thereof and an image-side surface 562 being concave in a paraxial region thereof. The image-side surface 562 of the sixth lens element 560 has at least one convex shape in an off-axis region thereof. The sixth lens element 560 is made of plastic material and has the object-side surface 561 and the image-side surface 562 being both aspheric.

The IR-cut filter 570 is made of glass and located between the sixth lens element 560 and the image surface 580, and will not affect the focal length of the optical imaging lens assembly. The image sensor 590 is disposed on or near the image surface 580 of the optical imaging lens assembly.

The detailed optical data of the 5th embodiment are shown in Table 9 and the aspheric surface data are shown in Table 10 below.

TABLE 9

5th Embodiment
f = 4.13 mm, Fno = 1.92, HFOV = 36.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.738 (ASP) | 0.782 | Glass | 1.542 | 62.9 | 3.21 |
| 2 | | 678.975 (ASP) | −0.026 | | | | |
| 3 | Ape. Stop | Plano | 0.108 | | | | |
| 4 | Lens 2 | −79.397 (ASP) | 0.220 | Plastic | 1.639 | 23.5 | −7.31 |
| 6 | | 4.968 (ASP) | 0.531 | | | | |
| 7 | Lens 3 | −92.907 (ASP) | 0.224 | Plastic | 1.639 | 23.5 | −23.35 |
| 8 | | 17.788 (ASP) | 0.286 | | | | |
| 9 | Lens 4 | −3.238 (ASP) | 0.583 | Plastic | 1.544 | 55.9 | −44.95 |
| 10 | | −3.969 (ASP) | 0.050 | | | | |
| 11 | Lens 5 | −13.679 (ASP) | 0.322 | Plastic | 1.544 | 55.9 | 56.27 |
| 12 | | −9.533 (ASP) | 0.057 | | | | |
| 13 | Lens 6 | 1.293 (ASP) | 0.800 | Plastic | 1.535 | 55.7 | 12.04 |
| 14 | | 1.268 (ASP) | 0.700 | | | | |
| 15 | IR-cut filter | Plano | 0.145 | Glass | 1.517 | 64.2 | — |

TABLE 9-continued

5th Embodiment
f = 4.13 mm, Fno = 1.92, HFOV = 36.3 deg.

| Surface # | | Curvature Radius | Thickness | Material | Index | Abbe # | Focal Length |
|---|---|---|---|---|---|---|---|
| 16 | | Plano | 0.521 | | | | |
| 17 | Image | Plano | — | | | | |

Note:
Reference wavelength is 587.6 nm (d-line).

TABLE 10

Aspheric Coefficients

| Surface # | 1 | 2 | 4 | 5 | 6 | 7 |
|---|---|---|---|---|---|---|
| k = | 6.2820E−01 | −9.9000E+01 | 3.0000E+01 | −2.8452E+01 | −9.9000E+01 | −3.1926E+01 |
| A4 = | −1.9581E−02 | −7.6045E−02 | −9.6372E−02 | −2.4430E−02 | −2.0786E−01 | −1.6319E−01 |
| A6 = | 7.1768E−03 | 1.3552E−01 | 2.8259E−01 | 2.0977E−01 | −8.1756E−02 | −6.2815E−02 |
| A8 = | −4.7625E−02 | −1.6655E−01 | −3.4719E−01 | −3.7503E−01 | 1.0826E−01 | 1.7915E−01 |
| A10 = | 4.9531E−02 | 1.0714E−01 | 2.7181E−01 | 4.5632E−01 | −1.0384E−01 | −2.4742E−01 |
| A12 = | −3.1650E−02 | −4.2534E−02 | −1.2136E−01 | −3.2389E−01 | −1.1869E−01 | 1.8303E−01 |
| A14 = | 4.2106E−03 | 8.9574E−03 | 3.1066E−02 | 1.0028E−01 | 2.0298E−01 | −5.7374E−02 |
| A16 = | — | — | — | — | −7.0123E−02 | 7.7294E−03 |

| Surface # | 8 | 9 | 10 | 11 | 12 | 13 |
|---|---|---|---|---|---|---|
| k = | −3.5891E+00 | 1.9087E+00 | 2.1656E+01 | 5.7093E+00 | −2.9001E+00 | −3.2796E+00 |
| A4 = | −1.6100E−01 | −4.5552E−01 | 2.5198E−01 | 3.4092E−01 | −2.3481E−01 | −1.2241E−01 |
| A6 = | 1.1819E−01 | 6.5035E−01 | −2.3570E−01 | −2.8783E−01 | 1.4984E−01 | 5.4303E−02 |
| A8 = | −6.4104E−02 | −7.5902E−01 | 1.0448E−01 | 1.3180E−01 | −5.2831E−02 | −1.7558E−02 |
| A10 = | 2.2868E−02 | 6.1343E−01 | −2.9162E−02 | −3.7569E−02 | 1.1293E−02 | 3.7246E−03 |
| A12 = | 1.5476E−03 | −3.0612E−01 | 4.7311E−03 | 6.5109E−03 | −1.4478E−03 | −4.6852E−04 |
| A14 = | −1.7351E−03 | 8.4865E−02 | −3.2207E−04 | −6.2693E−04 | 1.0267E−04 | 3.1786E−05 |
| A16 = | — | −9.8374E−03 | — | 2.5665E−05 | −3.1111E−06 | −9.0605E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.13 | Td [mm] | 3.94 |
| Fno | 1.92 | |R9/R10| | 1.43 |
| HFOV [deg.] | 36.3 | f/|R4| | 0.83 |
| V2 + V3 + V4 | 102.90 | f3 * f4/f6 | 87.17 |
| T23/(T12 + T34 + T45 + T56) | 1.12 | |f/f3| + |f/f4| + |f/f5| + |f/f6| | 0.69 |
| (T45 + T56)/Dr7r12 | 0.06 | Yc62/f | 0.38 |
| ΣAT/ΣCT | 0.34 | | |

6th Embodiment

Figure 11:
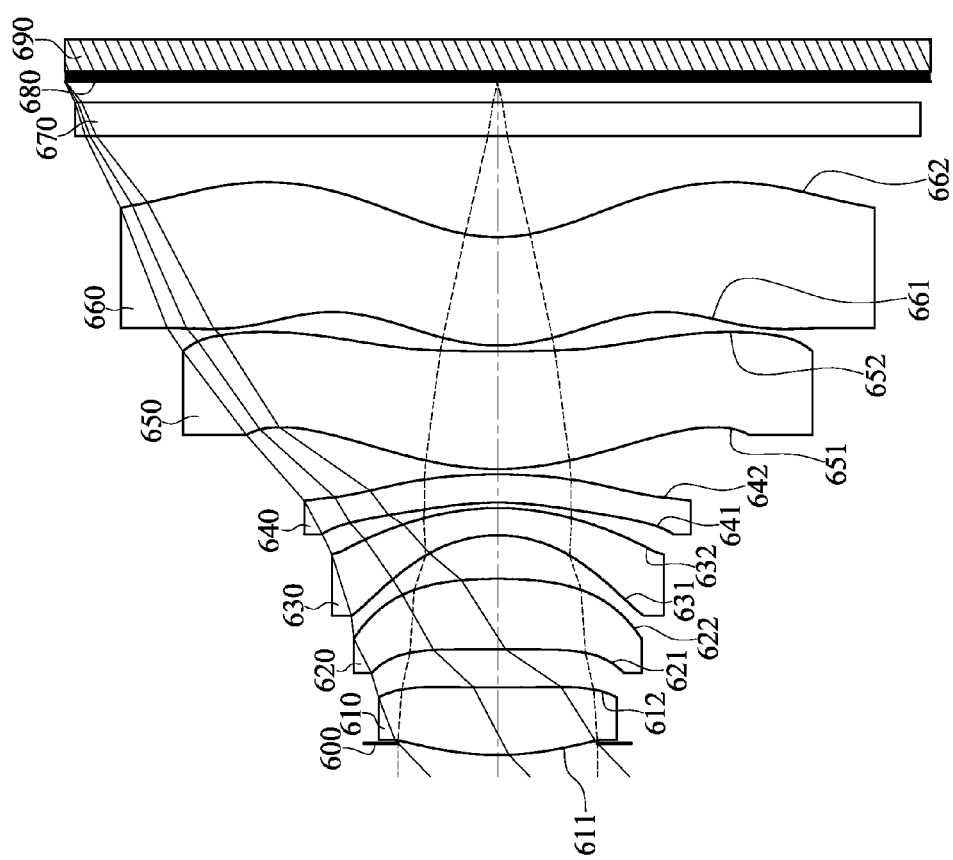
FIG. 11 is a schematic view of an image capturing unit according to the 6th embodiment of the present disclosure.
Figure 12:
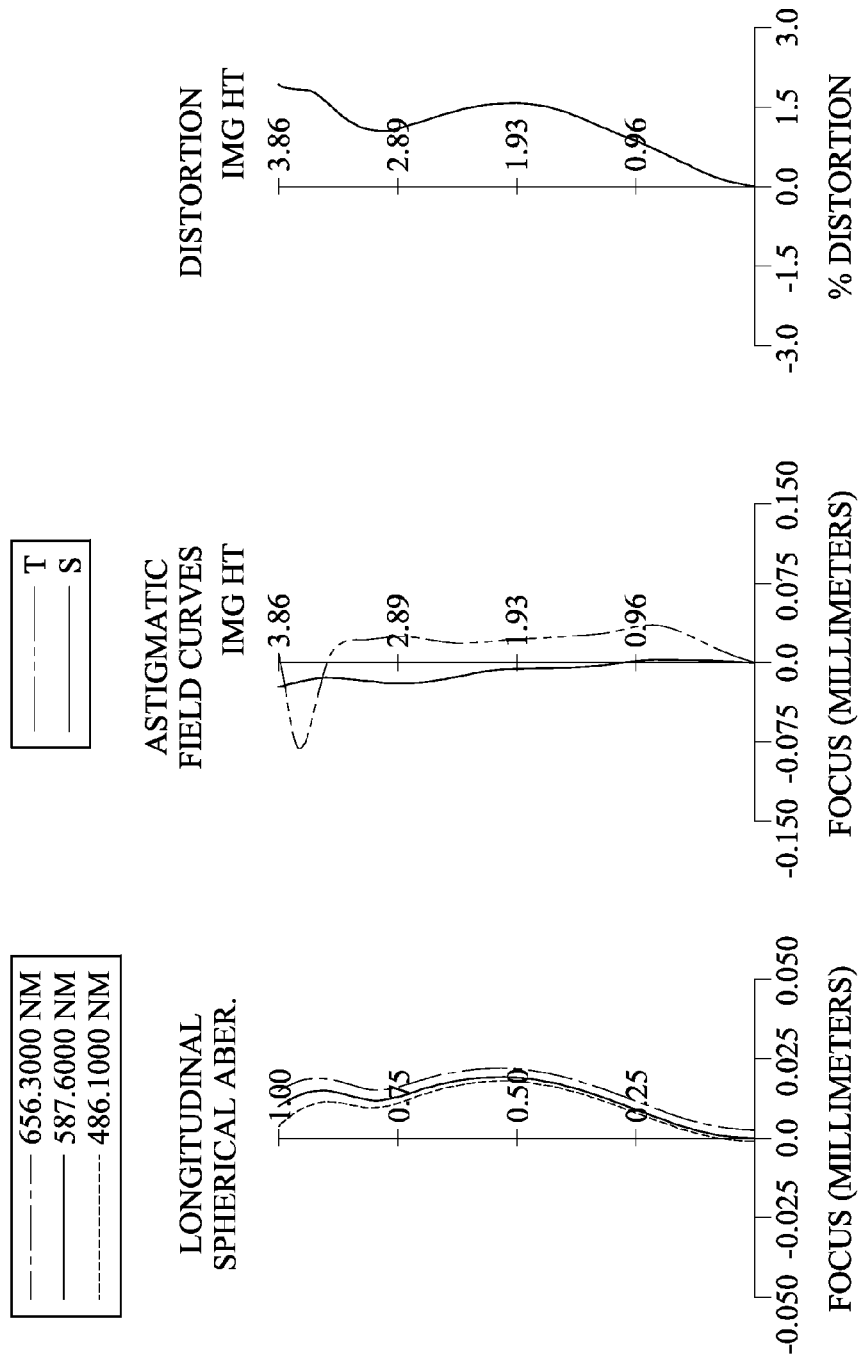
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 690. The optical imaging lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image surface 680, wherein the optical imaging lens assembly has a total of six lens elements (610-660) with refractive power.

The first lens element 610 with positive refractive power in a paraxial region thereof has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power in a paraxial region thereof has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power in a paraxial region thereof has an object-side surface 631 being concave in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power in a paraxial region thereof has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power in a paraxial region thereof has an object-side surface 651 being convex in a paraxial region thereof and an image-side surface 652 being convex in a paraxial region thereof. Both of the object-side surface 651 and the image-side surface 652 have at least one inflection point. The fifth lens element 650 is made of plastic material and has the object-side surface 651 and the image-side surface 652 being both aspheric.

The sixth lens element 660 with positive refractive power in a paraxial region thereof has an object-side surface 661 being convex in a paraxial region thereof and an image-side surface 662 being concave in a paraxial region thereof. The image-side surface 662 of the sixth lens element 660 has at least one convex shape in an off-axis region thereof. The sixth lens element 660 is made of plastic material and has the object-side surface 661 and the image-side surface 662 being both aspheric.

The IR-cut filter 670 is made of glass and located between the sixth lens element 660 and the image surface 680, and will not affect the focal length of the optical imaging lens assembly. The image sensor 690 is disposed on or near the image surface 680 of the optical imaging lens assembly.

The detailed optical data of the 6th embodiment are shown in Table 11 and the aspheric surface data are shown in Table 12 below.

TABLE 11

6th Embodiment
f = 3.91 mm, Fno = 2.20, HFOV = 44.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.105 | | | | |
| 2 | Lens 1 | 2.673 (ASP) | 0.600 | Plastic | 1.544 | 55.9 | 5.98 |
| 3 | | 13.824 (ASP) | 0.341 | | | | |
| 4 | Lens 2 | 86.607 (ASP) | 0.630 | Plastic | 1.544 | 55.9 | 6.71 |
| 5 | | −3.800 (ASP) | 0.386 | | | | |
| 6 | Lens 3 | −1.259 (ASP) | 0.243 | Plastic | 1.639 | 23.5 | −4.61 |
| 7 | | −2.366 (ASP) | 0.050 | | | | |
| 8 | Lens 4 | −2.618 (ASP) | 0.250 | Plastic | 1.639 | 23.5 | −7.78 |
| 9 | | −5.735 (ASP) | 0.050 | | | | |
| 10 | Lens 5 | 2.633 (ASP) | 1.050 | Plastic | 1.544 | 55.9 | 4.75 |
| 11 | | −122.572 (ASP) | 0.050 | | | | |
| 12 | Lens 6 | 1.607 (ASP) | 0.965 | Plastic | 1.583 | 30.2 | 18.24 |
| 13 | | 1.474 (ASP) | 0.900 | | | | |
| 14 | IR-cut filter | Plano | 0.300 | Glass | 1.517 | 64.2 | — |
| 15 | | Plano | 0.186 | | | | |
| 16 | Image | Plano | — | | | | |

Note:
Reference wavelength is 587.6 nm (d-line).

TABLE 12

| Aspheric Coefficients | | | | | | |
|---|---|---|---|---|---|---|
| Surface # | 2 | 3 | 4 | 5 | 6 | 7 |
| k = | 6.0263E−01 | 8.4550E+01 | 9.0000E+01 | 2.4541E+00 | −1.0559E+00 | −1.7389E+00 |
| A4 = | −2.3606E−02 | −5.3745E−02 | −6.1838E−02 | −6.2438E−02 | −1.7200E−01 | 1.6149E−02 |
| A6 = | −3.8197E−03 | −3.9427E−02 | −3.3129E−02 | −3.8979E−02 | 3.2713E−01 | −6.4404E−02 |
| A8 = | −4.6795E−02 | 5.0638E−03 | −1.6296E−02 | 1.3145E−02 | −6.2668E−01 | 1.0018E−01 |
| A10 = | 7.6293E−02 | −2.0026E−02 | −2.2223E−02 | −1.2663E−02 | 8.8501E−01 | −6.7568E−02 |
| A12 = | −6.6167E−02 | 2.9834E−03 | 1.6078E−02 | 1.2083E−02 | −7.1297E−01 | 2.0598E−02 |
| A14 = | −4.9707E−03 | 7.2619E−03 | 1.7733E−03 | −4.7237E−03 | 2.9198E−01 | −3.3138E−03 |
| A16 = | 1.9535E−02 | −2.7633E−03 | −1.9365E−03 | 3.6483E−04 | −4.6815E−02 | 4.6998E−04 |

| Surface # | 8 | 9 | 10 | 11 | 12 | 13 |
|---|---|---|---|---|---|---|
| k = | −2.7912E+01 | −8.4729E+00 | −1.1832E+00 | −9.9000E+01 | −1.5273E+00 | −1.8254E+00 |
| A4 = | −2.8042E−03 | −6.2724E−02 | −1.3055E−02 | 9.2739E−02 | −7.5045E−02 | −6.5561E−02 |
| A6 = | 1.0530E−02 | 4.9160E−02 | −1.2125E−02 | −5.5598E−02 | −4.7190E−04 | 1.2037E−02 |
| A8 = | −8.0679E−03 | −2.6157E−02 | 6.7477E−03 | 1.7749E−02 | 2.2701E−03 | −1.4549E−03 |
| A10 = | 1.5540E−03 | 1.3673E−02 | −1.9855E−03 | −3.5709E−03 | −1.1693E−04 | 1.0343E−04 |
| A12 = | −6.9879E−05 | −3.9984E−03 | 3.0291E−04 | 4.4294E−04 | −3.0858E−05 | −3.1980E−06 |
| A14 = | −3.3567E−05 | 4.4361E−04 | −2.0248E−05 | −3.0431E−05 | 3.8407E−06 | −1.6870E−09 |
| A16 = | −1.0978E−05 | −4.7093E−06 | 1.6358E−07 | 8.6741E−07 | −1.2704E−07 | 1.1475E−09 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.91 | Td [mm] | 4.62 |
| Fno | 2.20 | |R9/R10| | 0.02 |
| HFOV [deg.] | 44.0 | f/|R4| | 1.03 |
| V2 + V3 + V4 | 102.90 | f3 * f4/f6 | 1.97 |
| T23/(T12 + T34 + T45 + T56) | 0.79 | |f/f3| + |f/f4| + |f/f5| + |f/f6| | 2.39 |
| (T45 + T56)/Dr7r12 | 0.04 | Yc62/f | 0.53 |
| ΣAT/ΣCT | 0.23 | | |

7th Embodiment

Figure 13:
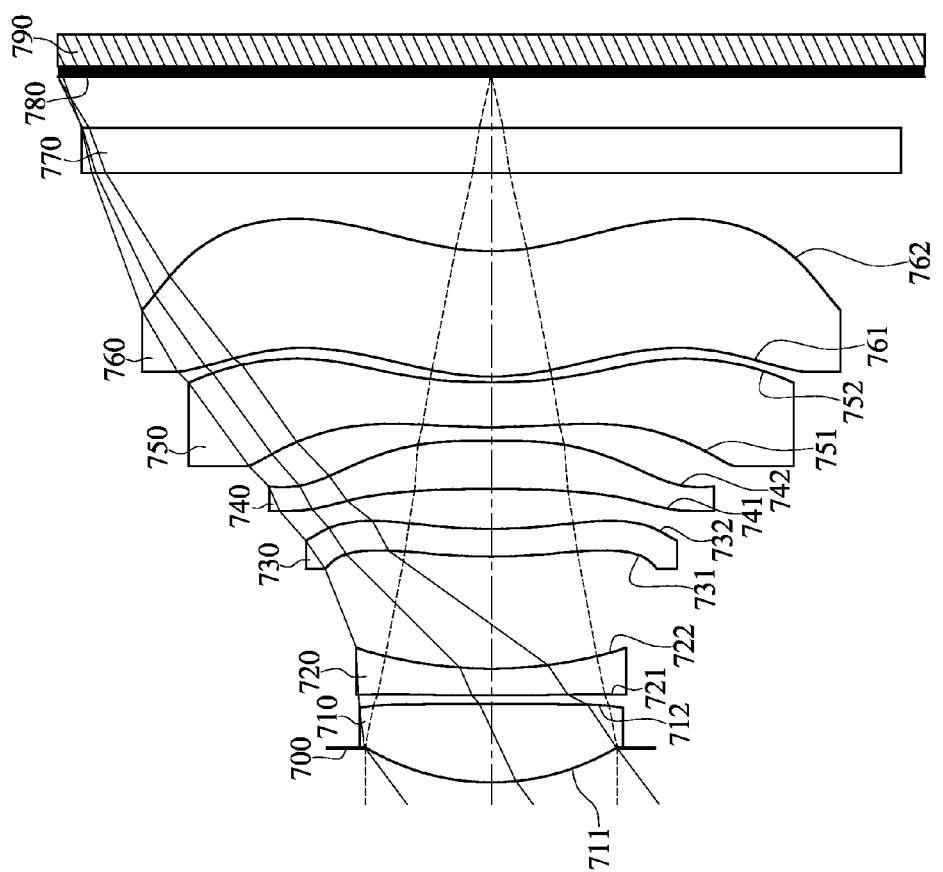
FIG. 13 is a schematic view of an image capturing unit according to the 7th embodiment of the present disclosure.
Figure 14:
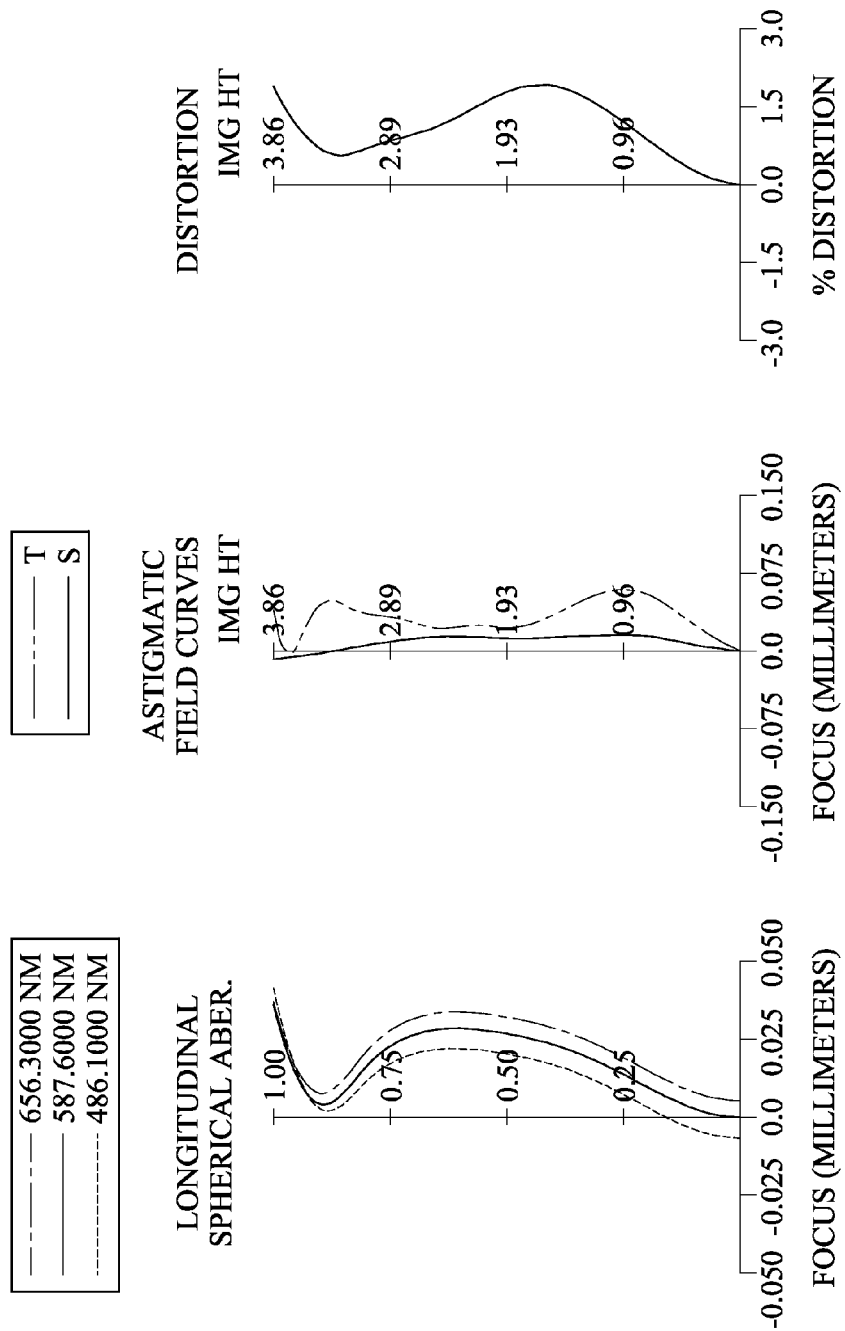
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 790. The optical imaging lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the optical imaging lens assembly has a total of six lens elements (710-760) with refractive power.

The first lens element 710 with positive refractive power in a paraxial region thereof has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power in a paraxial region thereof has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power in a paraxial region thereof has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with negative refractive power in a paraxial region thereof has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with positive refractive power in a paraxial region thereof has an object-side surface 751 being convex in a paraxial region thereof and an image-side surface 752 being concave in a paraxial region thereof. The object-side surface 751 of the fifth lens element 750 has at least one inflection point. The fifth lens element 750 is made of plastic material and has the object-side surface 751 and the image-side surface 752 being both aspheric.

The sixth lens element 760 with positive refractive power in a paraxial region thereof has an object-side surface 761 being convex in a paraxial region thereof and an image-side surface 762 being concave in a paraxial region thereof. The image-side surface 762 of the sixth lens element 760 has at least one convex shape in an off-axis region thereof. The sixth lens element 760 is made of plastic material and has the object-side surface 761 and the image-side surface 762 being both aspheric.

The IR-cut filter 770 is made of glass and located between the sixth lens element 760 and the image surface 780, and will not affect the focal length of the optical imaging lens assembly. The image sensor 790 is disposed on or near the image surface 780 of the optical imaging lens assembly.

The detailed optical data of the 7th embodiment are shown in Table 13 and the aspheric surface data are shown in Table 14 below.

TABLE 13

7th Embodiment
f = 5.04 mm, Fno = 2.25, HFOV = 36.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.304 | | | | |
| 2 | Lens 1 | 2.170 (ASP) | 0.700 | Plastic | 1.544 | 55.9 | 3.80 |
| 3 | | −38.060 (ASP) | 0.073 | | | | |
| 4 | Lens 2 | 25.715 (ASP) | 0.240 | Plastic | 1.639 | 23.5 | −7.58 |
| 5 | | 4.060 (ASP) | 0.996 | | | | |
| 6 | Lens 3 | 4.699 (ASP) | 0.247 | Plastic | 1.639 | 23.5 | −99.92 |
| 7 | | 4.287 (ASP) | 0.356 | | | | |
| 8 | Lens 4 | −18.838 (ASP) | 0.428 | Plastic | 1.639 | 23.5 | −42.69 |
| 9 | | −61.408 (ASP) | 0.122 | | | | |
| 10 | Lens 5 | 5.537 (ASP) | 0.400 | Plastic | 1.639 | 23.5 | 70.70 |
| 11 | | 6.132 (ASP) | 0.050 | | | | |
| 12 | Lens 6 | 2.120 (ASP) | 1.116 | Plastic | 1.544 | 55.9 | 21.80 |
| 13 | | 2.103 (ASP) | 0.700 | | | | |
| 14 | IR-cut filter | Plano | 0.400 | Glass | 1.517 | 64.2 | — |

TABLE 13-continued

7th Embodiment
f = 5.04 mm, Fno = 2.25, HFOV = 36.8 deg.

| Surface # | | Curvature Radius | Thickness | Material | Index | Abbe # | Focal Length |
|---|---|---|---|---|---|---|---|
| 15 | | Plano | 0.454 | | | | |
| 16 | Image | Plano | — | | | | |

Note:
Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | −1.6978E−02 | −1.0000E+00 | 3.0000E+00 | −1.1177E+01 | −3.8445E+00 | −2.0000E+01 |
| A4 = | 2.9573E−05 | 3.4806E−03 | −9.8483E−03 | 1.6725E−02 | −4.0349E−02 | −7.7256E−03 |
| A6 = | 1.5592E−03 | 3.7979E−03 | 3.2587E−02 | 7.2532E−03 | −1.1756E−02 | −2.6836E−02 |
| A8 = | 5.1860E−04 | −4.4633E−03 | −7.7221E−02 | −1.1128E−02 | 1.0678E−02 | 2.0066E−02 |
| A10 = | −2.9031E−03 | −4.2196E−03 | 1.0920E−01 | 6.6569E−03 | −8.0633E−03 | −2.2055E−02 |
| A12 = | 1.9749E−03 | −8.8080E−04 | −1.0531E−01 | −5.0298E−03 | 3.0535E−03 | 1.5361E−02 |
| A14 = | 2.1985E−04 | −8.9224E−04 | 4.9591E−02 | 1.9444E−03 | −3.6220E−04 | −5.3915E−03 |
| A16 = | −8.6778E−04 | 1.2506E−03 | −7.5919E−03 | 4.4031E−04 | −1.9933E−04 | 7.2844E−04 |

| Surface # | 8 | 9 | 10 | 11 | 12 | 13 |
|---|---|---|---|---|---|---|
| k = | 3.0000E+00 | −2.0000E+01 | −1.1945E+01 | −1.9541E+01 | −2.5828E+00 | −2.8796E+00 |
| A4 = | −5.9692E−02 | −2.5464E−01 | −1.0559E−01 | 7.0687E−02 | −7.5383E−02 | −5.1969E+00 |
| A6 = | 8.3833E−02 | 2.4303E−01 | 9.9411E−02 | −4.7828E−02 | 3.0962E−02 | 1.1442E+01 |
| A8 = | −7.4733E−02 | −1.5635E−01 | −7.7328E−02 | 1.2406E−02 | −1.1053E−02 | −2.5957E+01 |
| A10 = | 3.0797E−02 | 6.2351E−02 | 3.4034E−02 | −1.6915E−03 | 2.4407E−03 | 4.4583E+01 |
| A12 = | −5.3699E−03 | −1.3925E−02 | −8.2383E−03 | 1.2620E−04 | −3.0606E−04 | −4.7809E+01 |
| A14 = | 2.4642E−04 | 1.6019E−03 | 1.0277E−03 | −5.2208E−06 | 2.0247E−05 | 2.5219E+01 |
| A16 = | 1.6055E−05 | −7.4500E−05 | −5.1445E−05 | 1.1851E−07 | −5.4835E−07 | −4.3462E+00 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.04 | Td [mm] | 4.73 |
| Fno | 2.25 | |R9/R10| | 0.90 |
| HFOV [deg.] | 36.8 | f/|R4| | 1.24 |
| V2 + V3 + V4 | 70.50 | f3 * f4/f6 | 195.67 |
| T23/(T12 + T34 + T45 + T56) | 1.66 | |f/f3| + |f/f4| + |f/f5| + |f/f6| | 0.47 |
| (T45 + T56)/Dr7r12 | 0.08 | Yc62/f | 0.35 |
| ΣAT/ΣCT | 0.51 | | |

The foregoing image capturing unit is able to be installed in, but not limited to, an electronic device. According to the present disclosure, an optical imaging lens assembly provided in the disclosure includes, in order from an object side to an image side, a first lens element having positive refractive power in the paraxial region thereof, a second lens element having refractive power in the paraxial region thereof, a third lens element having negative refractive power in the paraxial region thereof, a fourth lens element having negative refractive power in the paraxial region thereof, a fifth lens element having refractive power in the paraxial region thereof and a sixth lens element having positive refractive power in the paraxial region thereof. The optical imaging lens assembly has a total of six lens elements with refractive power in the paraxial region thereof. When specific conditions are satisfied, it is favorable for distributing the refractive powers of the optical imaging lens assembly so as to reduce the aberration and the sensitivity. In particular, both of the third lens element and the fourth lens element have negative refractive power in the paraxial region thereof, so that it is favorable for correcting image distortion. Also, the image is more planar from a paraxial region thereof to an off-axis region thereof.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising, in order from an object side to an image side:

a first lens element with positive refractive power in a paraxial region thereof having an object-side surface being convex in a paraxial region thereof;
a second lens element having refractive power in a paraxial region thereof;
a third lens element having negative refractive power in a paraxial region thereof;
a fourth lens element having negative refractive power in a paraxial region thereof;
a fifth lens element having refractive power in a paraxial region thereof, wherein both of an object-side surface and an image-side surface of the fifth lens element are aspheric; and
a sixth lens element with positive refractive power in a paraxial region thereof having an object-side surface being convex in a paraxial region thereof and an image-side surface being concave in a paraxial region thereof, wherein the image-side surface of the sixth lens element has at least one convex shape in an off-axis region thereof, and both of the object-side surface and the image-side surface of the sixth lens element are aspheric;
wherein the optical imaging lens assembly has a total of six lens elements with refractive power, a focal length of the optical imaging lens assembly in the paraxial region thereof is f, a focal length of the third lens element in the paraxial region thereof is f3, a focal length of the fourth lens element in the paraxial region thereof is f4, a focal length of the sixth lens element in the paraxial region thereof is f6, a vertical distance between a non-axial critical point on the image-side surface of the sixth lens element and an optical axis is Yc62, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$0 < f3*f4/f6;$ $0.20 < Yc62/f < 0.75;$ and $0.90 < T23/(T12+T34+T45+T56).$

2. The optical imaging lens assembly of claim 1, wherein the fourth lens element has an object-side surface being concave in a paraxial region thereof and an image-side surface being convex in a paraxial region thereof.

3. The optical imaging lens assembly of claim 2, wherein the second lens element has negative refractive power in a paraxial region thereof.

4. The optical imaging lens assembly of claim 3, wherein an Abbe number of the second lens element is V2, an Abbe number of the third lens element is V3, an Abbe number of the fourth lens element is V4, and the following condition is satisfied:

$50 < V2+V3+V4 < 120.$

5. The optical imaging lens assembly of claim 3, wherein an axial distance between the object-side surface of the first lens element and the image-side surface of the sixth lens element is Td, and the following condition is satisfied:

$2.5[mm] < Td < 6.0[mm].$

6. The optical imaging lens assembly of claim 1, wherein a curvature radius of the object-side surface of the fifth lens element is R9, a curvature radius of the image-side surface of the fifth lens element is R10, and the following condition is satisfied:

$|R9/R10| < 1.0.$

7. The optical imaging lens assembly of claim 1, wherein a sum of axial distances between any two lens elements adjacent to each other is ΣAT, a sum of central thicknesses of the first lens element through the sixth lens element is ΣCT, and the following condition is satisfied:

$0.15 < \Sigma AT/\Sigma CT < 0.45.$

8. The optical imaging lens assembly of claim 1, wherein both of the object-side surface and the image-side surface of the fifth lens element have at least one inflection point.

9. The optical imaging lens assembly of claim 1, wherein the focal length of the optical imaging lens assembly in the paraxial region thereof is f, the focal length of the third lens element in the paraxial region thereof is f3, the focal length of the fourth lens element in the paraxial region thereof is f4, a focal length of the fifth lens element in the paraxial region thereof is f5, the focal length of the sixth lens element in the paraxial region thereof is f6, and the following condition is satisfied:

$|f/f3|+|f/f4|+|f/f5|+|f/f6| < 1.0.$

10. An optical imaging lens assembly comprising, in order from an object side to an image side:
a first lens element with positive refractive power in a paraxial region thereof having an object-side surface being convex in a paraxial region thereof;
a second lens element having refractive power in a paraxial region thereof;
a third lens element having negative refractive power in a paraxial region thereof;
a fourth lens element having negative refractive power in a paraxial region thereof;
a fifth lens element with refractive power in a paraxial region thereof having an object-side surface being convex in a paraxial region thereof, wherein both of the object-side surface and an image-side surface of the fifth lens element are aspheric; and
a sixth lens element with positive refractive power in a paraxial region thereof having an object-side surface being convex in a paraxial region thereof and an image-side surface being concave in a paraxial region thereof, wherein the image-side surface of the sixth lens element has at least one convex shape in an off-axis region thereof, and both of the object-side surface and the image-side surface of the sixth lens element are aspheric;
wherein the optical imaging lens assembly has a total of six lens elements with refractive power, a focal length of the optical imaging lens assembly in the paraxial region thereof is f, a focal length of the third lens element in the paraxial region thereof is f3, a focal length of the fourth lens element in the paraxial region thereof is f4, a focal length of the sixth lens element in the paraxial region thereof is f6, a vertical distance between a non-axial critical point on the image-side surface of the sixth lens element and an optical axis is Yc62, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$0 < f3*f4/f6;$ $0.20 < Yc62/f < 0.75;$ and $0.75 < T23/(T12+T34+T45+T56).$

11. The optical imaging lens assembly of claim 10, wherein the axial distance between the fourth lens element and the fifth lens element is T45, the axial distance between the fifth lens element and the sixth lens element is T56, an axial distance between an object-side surface of the fourth lens element and the image-side surface of the sixth lens element is Dr7r12, and the following condition is satisfied:

$(T45+T56)/Dr7r12 < 0.10.$

12. The optical imaging lens assembly of claim 10, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the axial distance between the fifth lens element and the sixth lens element is T56, and the following condition is satisfied:

$1.0 < T23/(T12+T34+T45+T56) < 2.5.$

13. The optical imaging lens assembly of claim 10, wherein a curvature radius of the object-side surface of the fifth lens element is R9, a curvature radius of the image-side surface of the fifth lens element is R10, and the following condition is satisfied:

$|R9/R10| < 1.0.$

14. The optical imaging lens assembly of claim 10, wherein a sum of axial distances between any two lens elements adjacent to each other is ΣAT, a sum of central thicknesses of the first lens element through the sixth lens element is ΣCT, and the following condition is satisfied:

$0.15 < \Sigma AT/\Sigma CT < 0.45.$

15. The optical imaging lens assembly of claim 10, wherein the focal length of the optical imaging lens assembly in the paraxial region thereof is f, a curvature radius of an image-side surface of the second lens element is R4, and the following condition is satisfied:

$f/|R4| < 2.0.$

16. The optical imaging lens assembly of claim 10, wherein the image-side surface of the fifth lens element is concave in a paraxial region thereof.

17. The optical imaging lens assembly of claim 10, wherein an Abbe number of the second lens element is V2, an Abbe number of the third lens element is V3, an Abbe number of the fourth lens element is V4, and the following condition is satisfied:

$50 < V2+V3+V4 < 120.$

18. An image capturing unit, comprising:
the optical imaging lens assembly of claim 10; and
an image sensor, wherein the image sensor is disposed on the image side of the optical imaging lens assembly.

19. An electronic device, comprising:
the image capturing unit of claim 18.

20. An optical imaging lens assembly comprising, in order from an object side to an image side:
a first lens element with positive refractive power in a paraxial region thereof having an object-side surface being convex in a paraxial region thereof;
a second lens element having refractive power in a paraxial region thereof;
a third lens element having negative refractive power in a paraxial region thereof;
a fourth lens element having negative refractive power in a paraxial region thereof;
a fifth lens element having positive refractive power in a paraxial region thereof, wherein both of an object-side surface and an image-side surface of the fifth lens element are aspheric; and
a sixth lens element with positive refractive power in a paraxial region thereof having an object-side surface being convex in a paraxial region thereof and an image-side surface being concave in a paraxial region thereof, wherein the image-side surface of the sixth lens element has at least one convex shape in an off-axis region thereof, and both of the object-side surface and the image-side surface of the sixth lens element are aspheric;
wherein the optical imaging lens assembly has a total of six lens elements with refractive power, a focal length of the optical imaging lens assembly in the paraxial region thereof is f, a focal length of the third lens element in the paraxial region thereof is f3, a focal length of the fourth lens element in the paraxial region thereof is f4, a focal length of the sixth lens element in the paraxial region thereof is f6, a vertical distance between a non-axial critical point on the image-side surface of the sixth lens element and an optical axis is Yc62, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following conditions are satisfied:

$0 < f3*f4/f6;$ $0.20 < Yc62/f < 0.75;$ and $0.55 < T23/(T12+T34+T45+T56).$

21. The optical imaging lens assembly of claim 20, wherein a sum of axial distances between any two lens elements adjacent to each other is ΣAT, a sum of central thicknesses of the first lens element through the sixth lens element is ΣCT, and the following condition is satisfied:

$0.15 < \Sigma AT/\Sigma CT < 0.45.$

22. The optical imaging lens assembly of claim 20, wherein an axial distance between the object-side surface of the first lens element and the image-side surface of the sixth lens element is Td, and the following condition is satisfied:

$2.5[mm] < Td < 6.0[mm].$

23. The optical imaging lens assembly of claim 20, wherein a curvature radius of the object-side surface of the fifth lens element is R9, a curvature radius of the image-side surface of the fifth lens element is R10, and the following condition is satisfied:

|R9/R10|<1.0.

24. The optical imaging lens assembly of claim 20, wherein the axial distance between the fourth lens element and the fifth lens element is T45, the axial distance between the fifth lens element and the sixth lens element is T56, an axial distance between an object-side surface of the fourth lens element and the image-side surface of the sixth lens element is Dr7r12, and the following condition is satisfied:

(T45+T56)/Dr7r12<0.10.

25. The optical imaging lens assembly of claim 20, wherein the second lens element has positive refractive power in a paraxial region thereof.

* * * * *

UNITED STATES PATENT AND TRADEMARK OFFICE
CERTIFICATE OF CORRECTION

PATENT NO.         : 9,239,447 B1
APPLICATION NO.    : 14/472101
DATED              : January 19, 2016
INVENTOR(S)        : Wei-Yu Chen It is certified that error appears in the above-identified patent and that said Letters Patent is hereby corrected as shown below:

IN THE CLAIMS

On Column 32, claim 9, line 28: replace "$|f/f3|+|f/f4|+|f/f5|+|f/f61<1.0$" with --$|f/f3|+|f/f4|+|f/f5|+|f/f6|<1.0$--

On Column 33, claim 15, line 50: replace "$f/|R41<2.0$" with --$f/|R4|<2.0$--

Signed and Sealed this
Third Day of May, 2016

Michelle K. Lee
*Director of the United States Patent and Trademark Office*